United States Patent
Shiozaki et al.

(10) Patent No.: US 7,393,476 B2
(45) Date of Patent: Jul. 1, 2008

(54) POSITIVE ELECTRODE ACTIVE MATERIAL FOR LITHIUM SECONDARY CELL AND LITHIUM SECONDARY CELL

(75) Inventors: Ryuji Shiozaki, Tokyo (JP); Akihiro Fujii, Osaka (JP); Kazuya Okabe, Osaka (JP); Toshiyuki Nukuda, Osaka (JP)

(73) Assignee: GS Yuasa Corporation, Minami-ku, Kyoto-shi (JP)

( * ) Notice: Subject to any disclaimer, the term of this patent is extended or adjusted under 35 U.S.C. 154(b) by 701 days.

(21) Appl. No.: 10/486,080

(22) PCT Filed: Nov. 12, 2002

(86) PCT No.: PCT/JP02/12171

§ 371 (c)(1),
(2), (4) Date: Feb. 6, 2004

(87) PCT Pub. No.: WO03/044881

PCT Pub. Date: May 30, 2003

(65) Prior Publication Data

US 2004/0234857 A1   Nov. 25, 2004

(30) Foreign Application Priority Data

Nov. 22, 2001   (JP) .............. 2001-358017

(51) Int. Cl.
*H01B 1/00* (2006.01)
*H01B 1/12* (2006.01)
*H01M 4/02* (2006.01)
*H01M 4/58* (2006.01)

(52) U.S. Cl. .......... 252/521.2; 358/1.15; 423/593; 423/599; 429/62; 429/137; 429/217; 429/221; 429/223; 429/231.1; 429/231.95

(58) Field of Classification Search ........ 252/521.2, 252/519.1, 500; 358/1.15; 423/593, 599; 429/231.95, 223, 224, 599, 231, 62, 137, 429/217, 221, 231.1
See application file for complete search history.

(56) References Cited

U.S. PATENT DOCUMENTS 5,817,436 A * 10/1998 Nishijima et al. .......... 429/223

(Continued)

FOREIGN PATENT DOCUMENTS

EP          0 872 450 A1   10/1998

(Continued)

OTHER PUBLICATIONS

Lu et al., Layered Cathode Materials Li[NixLi(1/3-2x/3)Mn(2/3-x/3)]O2 for Lithium-Ion Batteries, May 2001, Electrochemical and Solid-State Letters, 4 (11), pp. A191-A194.*

(Continued)

*Primary Examiner*—Mark Kopec
*Assistant Examiner*—Khanh T Nguyen
(74) *Attorney, Agent, or Firm*—McGinn IP Law Group PLLC

(57) ABSTRACT

A positive active material for lithium secondary batteries, includes a composite oxide including an oxide which is represented by the composite formula $Li_xMn_aNi_bCo_cO_2$ and has an $\alpha$-$NaFeO_2$ structure, and an impurity phase including $Li_2MnO_3$. The values a, b, and c are within such a range that in a ternary phase diagram showing the relationship among these, (a, b, c) is present on the perimeter of or inside the quadrilateral ABCD defined by point A (0.5, 0.5, 0), point B (0.55, 0.45, 0), point C (0.55, 0.15, 0.30), and point D (0.15, 0.15, 0.7) as vertexes, and $0.95 < x/(a+b+c) < 1.35$.

20 Claims, 3 Drawing Sheets

1; EXAMPLE 1      2; EXAMPLE 2
3; EXAMPLE 3      4; EXAMPLE 4
5; EXAMPLE 5      6; EXAMPLE 6
7; EXAMPLE 7      8; EXAMPLE 8
9; COMPARATIVE EXAMPLE 1   10; COMPARATIVE EXAMPLE 2
11; COMPARATIVE EXAMPLE 3

U.S. PATENT DOCUMENTS

| | | | |
|---|---|---|---|
| 5,922,491 A * | 7/1999 | Ikawa et al. | 358/1.15 |
| 6,153,332 A * | 11/2000 | Nishida et al. | 429/217 |
| 6,180,282 B1 * | 1/2001 | Nishida et al. | 429/137 |
| 6,183,718 B1 * | 2/2001 | Barker et al. | 423/599 |
| 6,207,325 B1 * | 3/2001 | Matsui et al. | 429/231.1 |
| 6,333,128 B1 * | 12/2001 | Sunagawa et al. | 429/231.95 |
| 6,440,606 B1 * | 8/2002 | Yoshizawa et al. | 429/221 |
| 6,447,951 B1 * | 9/2002 | Barker et al. | 429/218.1 |
| 6,524,749 B1 * | 2/2003 | Kaneda et al. | 429/231.95 |
| 6,805,996 B2 * | 10/2004 | Hosoya | 429/94 |
| 2002/0018746 A1 * | 2/2002 | Gao et al. | 423/593 |
| 2002/0055036 A1 * | 5/2002 | Shinohara et al. | 429/62 |
| 2002/0061443 A1 * | 5/2002 | Nakanishi et al. | 429/223 |
| 2002/0086210 A1 * | 7/2002 | Naruoka et al. | 429/223 |
| 2003/0082452 A1 * | 5/2003 | Ueda et al. | 429/231.1 |
| 2003/0180617 A1 * | 9/2003 | Fujimoto et al. | 429/231.1 |
| 2007/0160906 A1 * | 7/2007 | Tooyama et al. | 429/223 |

FOREIGN PATENT DOCUMENTS

| | | | |
|---|---|---|---|
| EP | 0 944 125 A1 | | 9/1999 |
| EP | 1 180 810 A2 | | 2/2002 |
| EP | 1 193 782 A2 | | 4/2002 |
| JP | 05-242891 | * | 9/1993 |
| JP | 07-262984 | * | 10/1995 |
| JP | 8-37006 | | 2/1996 |
| JP | 08-213015 | * | 8/1996 |
| JP | 9-55211 | | 2/1997 |
| JP | 10-116615 | | 5/1998 |
| JP | 2000-077071 | * | 3/2000 |
| JP | 2000-133262 | * | 5/2000 |
| JP | 2002-42813 | | 2/2002 |
| JP | 2002-100356 | | 4/2002 |
| JP | 2002-100357 | | 4/2002 |
| JP | 2002-100358 | | 4/2002 |
| JP | 2002-151076 | | 5/2002 |
| JP | 2003-2664 | | 1/2003 |
| JP | 2003-31219 | | 1/2003 |
| JP | 2003-34536 | | 2/2003 |
| JP | 2003-45414 | | 2/2003 |
| JP | 2003-45424 | | 2/2003 |

OTHER PUBLICATIONS

Numata et al., Synthesis and Characterization of Layer structure solid solutions in the system of LiCoO2-LiMnO3, Apr. 1998, Solid State Ionics, No. 117, pp. 257-263.*

Jang et al., Stabilization of LiMnO2 in the alpha-NaFeO2 Structure Type by LiAlO2 Addition, 1998, Electrochemical and Solid-Sate Letters, 1 (1), pp. 13-16.*

Yoshiya Makimura, et al., "Lithium Nickel Manganese Fukugo Sankabutsu no Gosei to Characterization", Dai 41 Kai Battery Symposium in Japan, Nov. 20 , 2000, pp. 460-461.

Tsutomu Kotsuki, et al., "Lithium Nickel Manganese Fukugo Sankabutsu no Insertion Denkyoku Kino", Dai 41 Kai Battery Symposium in Japan, Nov. 20, 2000, pp. 462-463.

* cited by examiner

1; EXAMPLE 1
2; EXAMPLE 2
3; EXAMPLE 3
4; EXAMPLE 4
5; EXAMPLE 5
6; EXAMPLE 6
7; EXAMPLE 7
8; EXAMPLE 8
9; COMPARATIVE EXAMPLE 1
10; COMPARATIVE EXAMPLE 2
11; COMPARATIVE EXAMPLE 3

POSITIVE ELECTRODE ACTIVE MATERIAL FOR LITHIUM SECONDARY CELL AND LITHIUM SECONDARY CELL

TECHNICAL FIELD

The present invention relates to a positive active material for lithium secondary batteries and to a lithium secondary battery.

BACKGROUND ART

Nonaqueous-electrolyte batteries represented by lithium secondary batteries are extensively used as power sources for small portable terminals, mobile communication apparatus, and the like because these batteries have a high operating voltage and a high energy density. The positive active materials for lithium secondary batteries are required to stably retain their crystal structure even when subjected to repetitions of lithium insertion/extraction and to have a large reversible electrochemical capacity.

Presently, an Li—Co composite oxide having an $\alpha$-NaFeO$_2$ structure (hereinafter the composite oxide is referred to as LiCoO$_2$) is mainly used as a positive active material for lithium secondary batteries. LiCoO$_2$ is capable of stable insertion/extraction of lithium ions at an operating potential as high as 4 V and stably retains its crystal structure even in repetitions of lithium ion insertion/extraction. LiCoO$_2$ hence shows a high energy density and simultaneously attains high charge/discharge cycle performance.

However, since cobalt, which is a constituent element for LiCoO$_2$, is a scare element and expensive, many investigations have been made on the use of an Li—Ni composite oxide (hereinafter referred to as LiNiO$_2$) as a substitute for LiCoO$_2$. LiNiO$_2$ has an $\alpha$-NaFeO$_2$ structure like LiCoO$_2$ and has almost the same operating potential width as LiCoO$_2$. LiNiO$_2$ is hence expected to attain high electrochemical performance. In non-patent document 1, the relationship between lithium extraction amount and crystal lattice is investigated by X-ray powder diffractometry. It has been reported therein that even when lithium is extracted from a positive electrode in charge/discharge at a depth of up to 200 mAh/g, the layer-to-layer spacing is stably maintained. However, there has been a problem that repetitions of charge/discharge at such a depth result in an abrupt decrease in discharge capacity.

Techniques for eliminating that problem are being extensively investigated which comprise displacing part of the nickel sites in an LiNiO$_2$ structure by an element of a different kind. For example, patent document 1 discloses a technique in which part of the nickel sites are displaced by an element such as cobalt or aluminum in an amount of substantially about 20% at the most to thereby improve charge/discharge performance and thermal stability. However, the composite oxide obtained by this technique is still insufficient in charge/discharge cycle performance and thermal stability as compared with LiCoO$_2$, although slight improvements in charge/discharge cycle performance and thermal stability are attained.

Furthermore, many investigations have been made on the use of an Li—Mn—Ni composite oxide obtained by displacing part of the nickel sites by manganese and an Li—Mn—Ni—Co composite oxide obtained by displacing part of the nickel sites by manganese and cobalt.

Techniques concerning the Li—Mn—Ni composite oxide are reported, for example, in patent documents 2 to 4. However, investigations made by the present inventors revealed that use of any of these techniques poses a problem that not only the electrochemical capacity at an operating voltage of around 4 V is considerably lower than that attained with LiNiO$_2$, but also charge/discharge cycle performance and high-rate discharge performance also are insufficient.

With respect to techniques concerning the Li—Mn—Ni—Co composite oxide, there is a report in, e.g., patent documents 5 to 12 that the composite oxide shows a higher energy density than the Li—Mn—Ni composite oxide. The Li—Mn—Ni—Co composite oxides described in these reports have a composition in which the proportions of cobalt and manganese in the 6b sites each are low and nickel is the main component. The term 6b sites as used herein means a Wyckoff position.

On the other hand, a technique for producing an Li—Mn—Ni—Co composite oxide using a precursor in which the proportions of manganese and cobalt in the 6b sites are high and the two components have been mixed with each other extremely evenly was recently reported in non-patent document 2 and non-patent document 3. There is a statement therein to the effect that in the LiCo$_{1/3}$Ni$_{1/3}$Mn$_{1/3}$O$_2$ reported therein, the manganese, nickel, and cobalt occupying the 6b sites are regularly arranged to thereby form a superlattice and this brings about a stable crystal structure. Because of this, lithium can be extracted without causing a phase change even at high voltages. It has also been found that this composite oxide further has excellent thermal stability probably because oxygen repulsion between c-axes after lithium elimination is relieved. It has further been found that although manganese is contained in the crystal lattice, lithium secondary batteries produced with this composite oxide are almost free from the phenomenon in which manganese dissolves in the electrolyte as in the case of using a spinel manganese material. The nonoccurrence of the phenomenon is thought to imply that the manganese ligand field is free from a Jahn-Teller distortion because the manganese has a valence of 4. Consequently, the composite oxide is advantageous in that adverse influences on battery performances, including the problem that the negative electrode comes to have increased resistance due to the manganese dissolution phenomenon, are diminished.

However, investigations made by the present inventors revealed that the problem of the decrease in discharge capacity with many repetitions of charge/discharge cycling still remains unsolved even with any of those techniques. There has been a desire for a technique for further improving charge/discharge cycle performance.

(Non-Patent Document 1)
T. Ohzuku, A. Ueda, and M. Nagayama, *J. Electrochem. Soc.*, (U.S.A.), 1993, Vol.140, No.7, pp.1862-1870
(Non-Patent Document 2)
Y. Koyama, I. Tanaka. H. Adachi, Y. Makimura, N. Yabuuchi, and T. Ohzuku, *Dai 42-kai Denchi Tôronkai Yokô-shû*, (Japan), 2001, pp.50-51
(Non-Patent Document 3)
Y. Makimura, N. Yabuuchi, and T. Ohzuku, and Y. Koyama, *Dai 42-kai Denchi Tôronkai Yokô-shû*, (Japan), 2001, pp.52-53
(Non-Patent Document 4)
C. S. Jhonson, S. D. Korte, J. T. Vaughey, M. M. Thacherey, T. E. Vofinger, Y. Shao-Horn, and S. A. Hackney, *J. Power Sources*, (Holland), 1999, Vol.81-82, pp.491-495
(Non-Patent Document 5)
K. Numata, C. Sasaki, and S. Yamanaka, *Chemistry Letters*, (Japan), 1997, pp.725-726
(Patent Document 1)
JP-A-9-231973
(Patent Document 2)
Japanese Patent No. 3,008,793

(Patent Document 3)
Japanese Patent No. 3,047,693
(Patent Document 4)
Japanese Patent No. 3,064,655
(Patent Document 5)
JP-A-2000-260480
(Patent Document 6)
JP-A-2000-260479
(Patent Document 7)
JP-A-2000-268878
(Patent Document 8)
JP-A-2000-353525
(Patent Document 9)
JP-A-10-255846
(Patent Document 10)
JP-A-8-37007
(Patent Document 11)
JP-A-2000-58068
(Patent Document 12)
JP-A-2000-277151
(Patent Document 13)
JP-A-11-317224
(Patent Document 14)
JP-A-2000-3706
(Patent Document 15)
JP-A-11-312519
(Patent Document 16)
JP-A-11-307093

The invention has been achieved in view of the problems described above. An object thereof is to provide a positive active material for lithium secondary batteries which is capable of giving a lithium secondary battery having a high energy density and excellent charge/discharge cycle performance. Another object thereof is to provide a lithium secondary battery having a high energy density and excellent charge/discharge cycle performance.

DISCLOSURE OF THE INVENTION

In view of the problems described above, the present inventors made intensive investigations on Li—Mn—Ni—Co composite oxides for use as a positive active material for lithium secondary batteries (hereinafter also referred to simply as "positive active material"). In the course of the investigations, the inventors directed attention to the relationship between the compositions of the manganese element, nickel element, and cobalt element which are likewise located at the 6b sites in a $Li_xMn_aNi_bCo_cO_2$ composition and each of the amount of an Li—Mn compound coexisting with the composite oxide and the properties and state of the composite oxide particles. The electrochemical properties of such composite oxides were closely investigated.

As a result, it has been found that a lithium secondary battery having a high discharge voltage, high electrochemical capacity, and excellent charge/discharge cycle performance is obtained by using a composite oxide having a specific composition and specific properties as a positive active material for the lithium secondary battery. The invention has been thus achieved. Specifically, the technical constitutions of the invention and the effects and advantages thereof are as follows. It is, however, noted that the explanations on the mechanisms of the effects include presumptions and whether these explanations on the mechanisms of the effects are correct or not does not limit the scope of the invention.

(1) A positive active material for lithium secondary batteries, characterized by comprising a composite oxide which is represented by the composite formula $Li_xMn_aNi_bCo_cO_2$ (wherein a, b, and c are values within such a range that in a ternary phase diagram showing the relationship among these, (a, b, c) is present on the perimeter of or inside the quadrilateral ABCD defined by point A (0.5, 0.5, 0), point B (0.55, 0.45, 0), point C (0.55, 0.15, 0.30), and point D (0.15, 0.15, 0.7) as vertexes, and 0.95<x/(a+b+c)<1.35) and has an $\alpha$-NaFeO$_2$ structure.

(2) The positive active material for lithium secondary batteries as described in (1) above, characterized in that the composite oxide contains $Li_2MnO_3$ and, in X-ray powder diffractometry with CuK$_\alpha$ ray, gives a diffraction diagram in which the ratio of the intensity of the diffracted ray at $2\theta=21\pm1.5°$ (s) to the intensity of the diffracted ray at $2\theta=18.6\pm0.3°$ (m), i.e., ratio s/m, is less than 0.04.

(3) The positive active material for lithium secondary batteries as described in (1) or (2) above, characterized in that the composite oxide has a BET specific surface area as measured by the N$_2$ adsorption method of 0.3 m$^2$/g or larger.

(4) The positive active material for lithium secondary batteries as described in any one of (1) to (3) above, characterized in that the composite oxide comprises particles which are secondary particles formed by the aggregation of primary particles, the primary particles having the shape of nearly a rectangular parallelopiped in which the ratio of the dimension of the longest side to that of the shortest side is 2 or smaller, and the primary particles having an average diameter of 0.6 μm or larger.

(5) The positive active material for lithium secondary batteries as described in any one of (1) to (4) above, characterized in that the composite oxide is one obtained by mixing a precursor with a lithium compound and heat-treating the mixture, the precursor mainly comprising a compound which has manganese and nickel as transition metal elements and optionally further has cobalt as another transition metal element and which has a $\beta$-Ni(OH)$_2$ type crystal structure.

(6) The positive active material for lithium secondary batteries as described any one of (1) to (4) above, characterized in that the composite oxide is one obtained by mixing a precursor having manganese and nickel as transition metal elements with a lithium compound and optionally with a precursor comprising a cobalt compound and heat-treating the mixture, the precursor mainly comprising a compound having a $\beta$-Ni(OH)$_2$ type crystal structure.

(7) The positive active material for lithium secondary batteries as described in (6) above, characterized in that the precursor comprising a cobalt compound is an oxide or a carbonation product salt.

(8) The positive active material for lithium secondary batteries as described in any one of (5) to (7) above, characterized in that the lithium compound is LiOH.

(9) A lithium secondary battery which has a positive electrode employing the positive active material for lithium secondary batteries as described in any one of (1) to (8) above and a negative electrode employing a negative-electrode material capable of doping/undoping lithium ions.

The range of the composition of the Li—Mn—Ni—Co composite oxide (composite formula; $Li_xMn_aNi_bCo_cO_2$) contained in the positive active material for lithium secondary batteries according to the invention is shown in FIG. 1 as a ternary phase diagram.

The positive active material for lithium secondary batteries of the invention comprises an LiMO$_2$ type composite oxide having an $\alpha$-NaFeO$_2$ structure. In general, production of a composite oxide having a composition within the range specified above yields a substance belonging to Li$_2$MnO$_3$ besides the target composite oxide having an LiMO$_2$ type crystal structure. Although $Li_2MnO_3$, when used alone, is an electrochemically inactive substance at potentials of around 4 V, the coexistence of the $LiMO_2$ type composite oxide and $Li_2MnO_3$ in an electrode material serves to improve the reversibility of lithium ion insertion/extraction reactions. The mechanism of this function has not been fully elucidated. However, the effect is thought to be because the presence of $Li_2MnO_3$ functions to, e.g., relieve the crystal lattice expansion/contraction accompanying charge/discharge and thereby serves to stabilize the crystal structure. The higher the proportion of manganese element in the transition metal elements used as starting materials, the more the proportion of the coexistent $Li_2MnO_3$ tends to increase. Increasing the proportion of manganese element in the composite oxide results in a slight decrease in theoretical electrochemical capacity. This is because the charge compensation accompanying the reaction in which lithium is extracted from the $LiMO_2$ type Li—Mn—Ni—Co composite oxide having an $\alpha$-$NaFeO_2$ structure is based on a valence change of nickel or cobalt, whereas the valence of $Mn^{4+}$ remains unchanged. However, even when the proportion of manganese element is increased, the feature that discharge reactions proceed at a high potential is not lost. A positive active material having a high energy density can hence be obtained. Furthermore, by increasing the proportion of manganese element in the composite oxide, a positive active material having high thermal stability even in a charged state can be obtained. From these standpoints, it is necessary that $a/(a+b) \geqq 0.5$ in the composite formula $Li_xMn_aNi_bCo_cO_2$. Conversely, in case where that value is less than 0.5, the reversibility of lithium ion insertion/extraction reactions cannot be sufficiently heightened, although the crystal system is homogeneous because of the reduced amount of the coexistent $Li_2MnO_3$. By regulating that value to 0.5 or larger, the reversibility of lithium ion insertion/extraction reactions can be markedly improved especially when the reactions are conducted at a high rate.

On the other hand, in case where the proportion of manganese element in the composite oxide is increased excessively, the composite oxide comes to contain an $Li_2MnO_3$ phase in such a large amount that the presence of this phase is clearly observed on an X-ray diffraction diagram, probably because the $LiMO_2$ type crystal structure becomes close to an $LiMnO_2$ phase and, hence, manganese atoms form an exceedingly unstable ligand field in the crystal structure. In such a case, not only the electrochemical capacity at around 4 V decreases but also the effect of improving the reversibility of lithium ion insertion/extraction reactions comes to be hardly observed. From this standpoint, it is necessary that the composite formula $Li_xMn_aNi_bCo_cO_2$ should satisfy the relationship $a/(a+b+c) \leqq 0.55$. In case where the value of $a/(a+b+c)$ exceeds 0.55, the composite oxide gives an X-ray diffraction diagram in which the diffracted rays attributable to the (020) plane and (110) plane of an $Li_2MnO_3$ phase which appear at around 21° (actually, at 21±1.5°) are observed mostly in an overlapped state but clearly.

Incidentally, too low proportions of nickel element in the composite oxide tend to result in a material in which two or more crystal systems coexist. This phenomenon can be understood from the fact that $LiMnO_2$ and $LiCoO_2$ do not form a stable solid solution between these. From this standpoint, it is necessary that $b/(a+b+c) \geqq 0.15$.

Consequently, the positive active material for lithium secondary batteries can be made to have, in particular, excellent cycle performance by regulating the compositions of the transition metals in the composite formula $Li_xMn_aNi_bCo_cO_2$ so as to be in such a range that in a ternary phase diagram, (a, b, c) is present on the perimeter of or inside the quadrilateral ABCD defined by point A (0.5, 0.5, 0), point B (0.55, 0.45, 0), point C (0.55, 0.15, 0.30), and point D (0.15, 0.15, 0.7) as vertexes.

Preferred of such compositions is one in which $c/(a+b+c) \geqq 0.5$. The positive active material having this composition can combine, in particular, a high energy density and satisfactory high-rate charge/discharge cycle performance.

The invention may be characterized in that the composite oxide contains $Li_2MnO_3$ and, in X-ray powder diffractometry with $CuK_\alpha$ ray, gives a diffraction diagram in which the ratio of the intensity of the diffracted ray at $2\theta=21\pm1.5°$ (s) to the intensity of the diffracted ray at $2\theta=18.6\pm0.3°$ (m), i.e., ratio s/m, is less than 0.04.

As stated above, an $Li_2MnO_3$ phase is slightly present besides the $LiMO_2$ type crystal structure when the manganese, nickel, and cobalt proportions are within the ranges specified in the invention. This $Li_2MnO_3$ has a structure in which a lithium phase and an ($LiMn_2$) phase are alternately superposed through oxygen atoms to have the same structure as $\alpha$-$NaFeO_2$, as described in non-patent document 4. The $LiMO_2$ type crystal structure is hence similar in X-ray diffraction pattern to the $Li_2MnO_3$. However, the $Li_2MnO_3$ shows weak diffracted rays attributable to the (020) plane and (110) plane at around $2\theta=21°$ (actually at 21±1.5°). These diffracted rays in the X-ray diffraction diagram are an index to the presence of an $Li_2MnO_3$ phase.

The inventors have found that when a composite oxide in which the ratio of the intensity of those diffracted rays usable as an index to the presence of $Li_2MnO_3$, i.e., the intensity of the diffracted rays at a $2\theta$ of around 21° (actually at 21±1.5°) (s), to the intensity of the diffracted ray at $2\theta=18.6\pm0.3°$ (m), i.e., ratio s/m, is less than 0.04 is used to produce a lithium secondary battery, then this battery exhibits high charge/discharge cycle performance. The mechanism of this effect has not been fully elucidated. However, it is thought that when the value of intensity ratio s/m is below 0.04, the $Li_2MnO_3$ phase exerts no adverse influence on or exerts a favorable influence on the crystal structure changes of the $LiMO_2$ type crystal structure phase which accompany lithium insertion/extraction reactions. On the other hand, in case where the value of intensity ratio s/m is 0.04 or larger, the adverse influence of the $Li_2MnO_3$ phase is thought to be predominant, resulting in a decrease in the charge/discharge cycle performance of the lithium secondary battery employing this composite oxide.

When no peak is observed at around $2\theta=21°$, the diffracted ray intensity (s) is 0 and the value of intensity ratio s/m is 0. Such composite oxide also is included in the compositions in which the value of intensity ratio s/m is below 0.04.

In the invention, an $Li_2MnO_3$ phase and an $LiMO_2$ phase are regarded as dividual phases. However, the relationship between X-ray diffracted ray intensities indicates a possibility that the two phases coexist in a solid solution state.

The invention may be further characterized in that the composite oxide has a BET specific surface area as measured by the $N_2$ adsorption method of 0.3 $m^2$/g or larger.

Regulating the composite oxide so as to have a specific surface area of 0.3 $m^2$/g or larger is preferred because such surface area enables the particles of the active material to come into satisfactory contact with a liquid electrolyte and prevents the rate of lithium ion movement from being determined by movement within the secondary particles of the active material. Such values of specific surface area are preferred in that the positive active material can have, in particular, excellent charge/discharge cycle performance. It is more preferred to regulate the specific surface area thereof to 0.5 $m^2$/g or larger because this positive active material can be used to produce a lithium secondary battery which shows a high discharge voltage, high electrochemical capacity, and high charge/discharge cycle performance.

The composite oxide comprises particles which are secondary particles formed by the aggregation of primary particles, the primary particles having the shape of nearly a rectangular parallelopiped in which the ratio of the dimension of the longest side to that of the shortest side is 2 or smaller, and the primary particles having an average diameter of 0.6 µm or larger.

A composite oxide in which the primary-particle diameter is smaller than 0.6 µm or the primary particles, when regarded as rectangular parallelepipeds, have a longest-side/shortest-side dimensional ratio exceeding 2 indicates that solid-phase reactions in the heat treatment of a precursor did not proceed sufficiently. In case where such a material is used as the positive active material of a lithium secondary battery, not only the battery has reduced electrochemical performance, but also the positive-electrode material is apt to undergo side reactions with the electrolyte because the area of contact with the electrolyte is excessively large due to the too large surface area.

The composite oxide preferably is one obtained by mixing a precursor with a lithium compound and heat-treating the mixture, the precursor mainly comprising a compound which has manganese and nickel as transition metal elements and optionally further has cobalt as another transition metal element and which has a $\beta$-Ni(OH)$_2$ type crystal structure. Alternatively, the composite oxide may be one obtained by mixing a precursor comprising a compound which has manganese and nickel as transition metal elements and has a $\beta$-Ni(OH)$_2$ type crystal structure with a lithium compound and optionally with a precursor comprising a cobalt compound and heat-treating the mixture.

The composite oxide represented by the composite formula Li$_x$Mn$_a$Ni$_b$Co$_c$O$_2$ according to the invention has a composition in which the proportion of manganese in the 6b sites is relatively high. The inventors have surprisingly found that when a precursor mainly comprising a $\beta$-Ni(OH)$_2$ type crystal structure is used as a precursor to be heat-treated which contains at least manganese and nickel, then an Li—Mn—Ni—Co composite oxide having an especially high crystallinity can be produced and a positive active material for lithium secondary batteries which has excellent electrochemical properties can be obtained.

The crystal structure of the precursor to be heat-treated is thus important. In the case where a precursor material including a separate phase consisting of a manganese compound or nickel compound alone is used, there is a possibility that the progress of solid-phase reactions between metal elements during the heat treatment might be inhibited, making it difficult to form a highly crystalline composite oxide. It is therefore preferred to use a precursor in which at least the manganese and nickel, among the transition metal elements (Mn, Ni, and Co) constituting the precursor, constitute a homogeneous crystal structure. Even in the case where the transition metal elements constituting a precursor are present as a homogeneous crystal structure, a reduced discharge capacity tends to result when the precursor contains an $\alpha$-Ni(OH)$_2$ type crystal structure in a large amount. It is therefore preferred to use a precursor in which the content of an $\alpha$-Ni(OH)$_2$ type crystal structure is low. A precursor mainly comprising $\beta$-Ni(OH)$_2$, in X-ray diffractometry with CuK$_\alpha$ ray, gives a diffraction diagram having an intense main peak at around 20°. On the other hand, a precursor containing an $\alpha$-Ni(OH)$_2$ type crystal structure in a large amount shows characteristic diffraction peaks at around 10° and 22° besides that peak. Conversely, when the X-ray diffraction diagram for the precursor mainly comprising $\beta$-Ni(OH)$_2$ is drawn so that the peak appearing at around 20° is full-scale, then substantially no peak is observed at around 10° and 22°. The composite oxide obtained by heat-treating a precursor which is such a compound containing an $\alpha$-Ni(OH)$_2$ type crystal structure in a large amount gives an X-ray diffraction diagram in which a diffracted ray thought to be assigned to an Li$_2$MnO$_3$ phase is clearly observed at around 21° (actually at 21±1.5°) besides the diffracted ray assigned to a crystal phase belonging to R3-m. With respect to expressions of the crystal phase, the numeral 3 should originally bear a bar, -, affixed thereover. In this description, however, the expression "R3-m" is used for convenience.

Selection of an oxide or a carbonation product salt as the precursor comprising a cobalt compound is preferred because this precursor is apt to undergo solid-phase reactions at the heat treatment temperature and is less apt to yield impurities. On the other hand, when a nitrate or carbonate is used, there is a possibility that concentration might occur at the heat treatment temperature to destroy the crystal structure of the precursor. It is therefore preferred to select an oxide or a carbonation product salt.

Selection of LiOH as the lithium compound is preferred because the melting point of LiOH is about 450° C., which is relatively low, and solid phase reactions can hence be conducted without the necessity of especially using a high temperature for the heat treatment of the precursor.

The invention further provides a lithium secondary battery which has a positive electrode employing the positive active material for lithium secondary batteries and a negative electrode employing a negative-electrode material capable of doping/undoping lithium ions. This lithium secondary battery can have the above-described features of the positive active material.

BEST MODE FOR CARRYING OUT THE INVENTION

Figure 1:
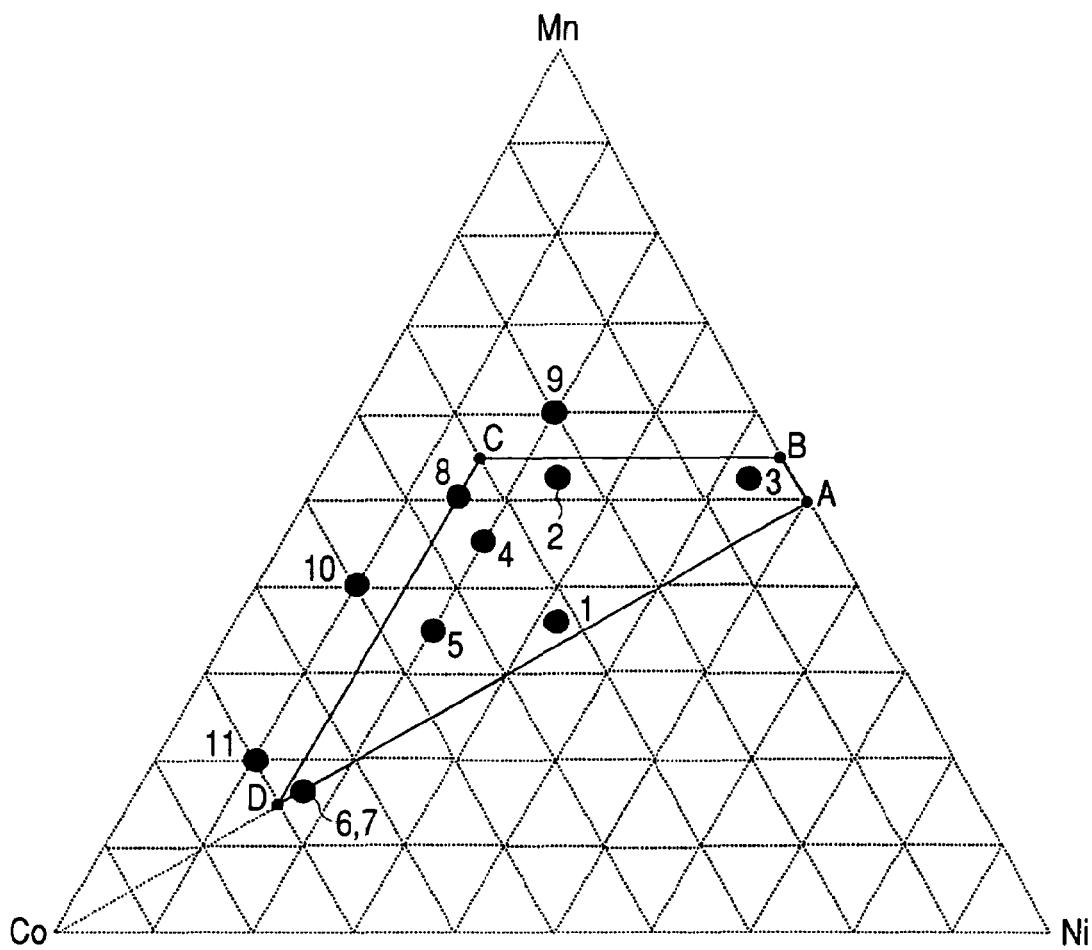
FIG. 1 is a ternary phase diagram showing compositions of Li$_x$Mn$_a$Ni$_b$Co$_c$O$_2$.

The positive active material of the invention is characterized by comprising a composite oxide which is represented by the composite formula Li$_x$Mn$_a$Ni$_b$CO$_c$O$_2$ (wherein a, b, and c are values within such a range that in a ternary phase diagram showing the relationship among these, (a, b, c) is present on the perimeter of or inside the quadrilateral ABCD defined by point A (0.5, 0.5, 0), point B (0.55, 0.45, 0), point C (0.55, 0.15, 0.30), and point D (0.15, 0.15, 0.7) as vertexes, and 0.95<x/(a+b+c)<1.35) and has an $\alpha$-NaFeO$_2$ structure.

The values of a, b, and c can be freely regulated by selecting the proportions of compounds of the respective transition metals to be used as starting materials.

The composite oxide preferably contains Li$_2$MnO$_3$ and, in X-ray powder diffractometry with CuK$_\alpha$ ray, gives a diffraction diagram in which the ratio of the intensity of the diffracted ray at 2θ=21±1.5° (s) to the intensity of the diffracted ray at 2θ=18.6±0.3° (m), i.e., ratio s/m, is less than 0.04.

An s/m ratio less than 0.04 can be attained by using starting materials in which the proportion of manganese in the transition metal atoms is not too high, as stated above, and by using a precursor mainly containing a β-Ni(OH)$_2$ type crystal structure as the precursor to be heat-treated, as will be described later.

The composite oxide preferably has a BET specific surface area as measured by the N$_2$ adsorption method of 0.3 m$^2$/g or larger.

A specific surface area of 0.3 m$^2$/g or larger for the composite oxide can be attained by regulating the heat treatment temperature and heat treatment period in a precursor heat treatment step so as not to be higher or longer than the upper limit of the preferred range of conditions which will be described later.

Furthermore, the composite oxide preferably comprises particles which are secondary particles formed by the aggregation of primary particles, the primary particles having the shape of nearly a rectangular parallelopiped in which the ratio of the dimension of the longest side to that of the shortest side is 2 or smaller, and the primary particles having an average diameter of 0.6 μm or larger.

The reason for this is as follows. With the progress of solid-phase reactions in a precursor heat treatment step, that dimensional ratio tends to decrease and the particle shape tends to approach a nearly cubical one. Namely, that dimensional ratio roughly correlates to the degree of progress of the solid-phase reactions. A composite oxide in which the primary particles have the shape of nearly a regular parallelopiped wherein that dimensional ratio is 2 or smaller and have an average diameter of 0.6 μm or larger can be obtained by regulating the heat treatment temperature and heat treatment period in a precursor heat treatment step so as not to be lower or shorter than the lower limit of the preferred range of conditions which will be described later.

As long as the composite oxide constituting the positive active material has the constitutions described above, processes for producing the composite oxide are not limited. However, especially preferred production processes will be explained below in detail.

The composite oxide preferably is obtained by mixing a precursor with a lithium compound and heat-treating the mixture, the precursor mainly comprising a compound which has manganese and nickel as transition metal elements and optionally further has cobalt as another transition metal element and which has a β-Ni(OH)$_2$ type crystal structure.

An explanation will be given below on preferred embodiments of the precursor to be used for producing the composite oxide (positive active material) according to the invention and on processes for producing the same. The precursor preferably is a compound having an Ni(OH)$_2$ type crystal structure in which manganese atoms have been incorporated optionally together with cobalt atoms into nickel sites so that these atoms and nickel atoms are evenly arranged. These manganese atoms serving as a component of the precursor crystals preferably have a valence of 2. By regulating the precursor so that the manganese contained therein mainly has a valence of 2, the product of the heat treatment can be made to contain a reduced amount of Li$_2$MnO$_3$ yielded as an impurity phase. Li$_2$MnO$_3$ is causative of a decrease in capacity, although it is a substance which is electrochemically inactive at around 4 V and serves to stabilize the crystal structure of the composite oxide. It is therefore preferred to regulate the composite oxide (positive active material) so that the content of Li$_2$MnO$_3$ therein is not too high.

Processes for producing the precursor are not particularly limited as long as the requirements shown above are satisfied. However, use may be made of a "coprecipitation method" in which an acidic aqueous solution containing at least nickel and manganese is added dropwise to an aqueous alkali solution, e.g., an aqueous sodium hydroxide solution, as a reaction mixture to form a precipitate. Drying the precipitate obtained by the "coprecipitation method" gives a precursor. When the "coprecipitation method" is used, a composite oxide (positive active material) in which the crystal structure is highly stable to lithium extraction/insertion reactions is easy to obtain as the final product. In particular, a positive active material showing high battery performance can be produced.

In the case of employing the "coprecipitation method", it is firstly important to keep the pH of the reaction mixture at an alkaline value of 11 or higher for obtaining a precursor in which the manganese contained therein mainly has a valence of 2. In case where the reaction mixture has too high a pH, the rate of precipitate formation increases and this tends to result in a precursor having a reduced density. From this standpoint, the pH of the reaction mixture is preferably 13 or lower, more preferably 12 or lower. Secondly, it is crucially important to keep the reaction mixture serving as a reducing atmosphere. When these conditions are used, the valence of the manganese is kept at 2 and drying the resultant precipitate gives a precursor which is a crystalline substance mainly comprising a β-Ni(OH)$_2$ type structure. In case where those conditions are not maintained, not only water and an anion species, such as carbonic acid anions, are apt to be incorporated into the crystal structure, but also the valence of the manganese is apt to increase and the precipitate thus yielded, upon drying, gives a precursor containing an α-Ni(OH)$_2$ type structure in a large amount. For keeping the reaction mixture serving as a reducing atmosphere, use may be made of a method in which a reducing agent, e.g., hydrazine, is added to the reaction mixture or a method in which the atmosphere in the reaction vessel is filled with an inert gas to thereby remove oxygen and keep the reaction system serving as a reducing atmosphere. Known techniques for adding a reducing agent, e.g., hydrazine, into the reaction mixture or for filling the atmosphere in the reaction vessel with an inert gas are described in patent documents 13 to 16, which disclose processes for producing a positive active material for alkaline batteries.

The transition metal compounds to be used as starting materials for a precursor in the "coprecipitation method" are not particularly limited as long as they undergo a precipitation reaction with the aqueous alkali solution. It is, however, preferred to use metal salts having high solubility in water. Examples of the metal salts having high solubility in water include manganese compounds such as manganese oxide, manganese carbonate, manganese sulfate, and manganese nitrate, nickel compounds such as nickel hydroxide, nickel carbonate, nickel sulfate, and nickel nitrate, and cobalt compounds such as cobalt sulfate and cobalt nitrate.

It is preferred in the "coprecipitation method" to cause ammonium ions to be present in the reaction mixture. The presence of ammonium ions reduces the rate of the precipitation reactions because the precipitation comes to occur via metal/ammine complex-forming reactions. As a result, a precipitate having satisfactory crystal orientation, compositional homogeneity, and uniformity of secondary-particle shape can be yielded. It is especially preferred to generate nuclei for crystal growth under such conditions that the reaction mixture contains an excess of ammonium ions over the ions of metals, such as manganese, nickel, and cobalt, which are derived from starting materials and present in the reaction mixture. This is because use of such conditions yields a precipitate which is exceedingly homogeneous and is bulky. Examples of techniques for causing ammonium ions to be present include a technique in which ammonium sulfate, ammonium water, or the like is added to the reaction mixture system. Conversely, in case where no ammonium ions are present, the metal ions rapidly form a precipitate through acid-base reactions. This precipitate hence tends to comprise crystals arranged randomly and be nonuniform in particle shape and nonhomogeneous in intraparticulate composition.

Among reaction conditions for the "coprecipitation method", apparatus factors such as reactor shape and the kind of rotating blades and other factors such as the time period of precipitate residence in the reaction vessel, reaction vessel temperature, total ion amount, and concentration of an oxidation number regulator can be selected to thereby slightly regulate properties of the coprecipitation compound, such as, e.g., particle shape, bulk density, and surface area.

The composite oxide may be one obtained by mixing a precursor mainly comprising a compound which has manganese and nickel as transition metal elements and has a β-Ni(OH)$_2$ type crystal structure with a lithium compound and optionally with a precursor comprising a cobalt compound and heat-treating the mixture. In this case, the precursor comprising a cobalt compound preferably is an oxide or a carbonation product salt.

Examples of the oxide of cobalt include cobalt monoxide, cobalt oxyhydroxide, and tricobalt tetroxide. Examples of the carbonation product of cobalt include basic cobalt carbonate.

The precursor may be produced by subjecting any of the cobalt compounds shown below to a coating treatment with a manganese and nickel compound. Namely, the precursor can be produced by dropping a solution containing manganese and nickel into a suspension of a cobalt compound to thereby evenly form an Mn—Ni deposit. The cobalt compound to be used here is not particularly limited as long as it has low solubility. It is, however, preferred to use cobalt(II) oxide, cobalt(III) oxide hydroxide, dicobalt(III)-monocobalt(II) tetroxide, cobalt(II) hydroxide, or the like. As stated above, it is necessary to keep the reaction system serving as a reducing atmosphere for inhibiting the valence of the manganese from increasing. Furthermore, the presence of ammonium ions is basically necessary for evenly growing crystals on the cobalt compound. However, since the cobalt compound is already present, there are cases where the presence of ammonium ions is unnecessary under some conditions.

For mixing the precursor with a lithium compound, use can be made of a method in which these ingredients in a powder form are mechanically mixed together. With respect to the mixing ratio Li:(Mn+Ni+Co), the starting materials should be used in respective given amounts according to the target composition. However, it is preferred to use a lithium compound in slight excess in order to inhibit the growth of an Li$_2$MnO$_3$ phase, as can be seen from investigations on a solid phase of LiMnO$_2$ and LiCoO$_2$ (see non-patent document 5). When the starting materials are used in such a proportion that the composite oxide obtained therefrom through a heat treatment has an atomic ratio Li/(Mn+Ni+Co) which is less than 1.35, more preferably 1.2 or lower, most preferably 1.10 or lower, and exceeds 0.95, then a positive active material for lithium secondary batteries having a high energy density and high charge/discharge cycle performance can be obtained. In case where that ratio is 1.35 or higher, there is a high possibility that the excess lithium compound might accumulate on the surface of the active material, resulting in a reduced discharge capacity. In case where that ratio is 0.95 or lower, there is a possibility that an oxygen deficiency might occurs for compensating for a charge deficiency to cause a structural change, resulting in inhibition of lithium movement and in considerably reduced battery performance.

The temperature for the heat treatment of the precursor/lithium compound mixture is preferably from 900° C. to 1,050° C., more preferably from 950 to 1,025° C. Heat treatment temperatures lower than 900° C. are apt to pose a problem that discharge capacity decreases probably because a structural factor which inhibits lithium movement arises. On the other hand, even when the heat treatment temperature exceeds 1,050° C., synthesis is possible. However, heat treatment temperatures exceeding 1,050° C. are apt to pose a problem that particle densification proceeds to impair battery performances and a problem that the lithium is apt to volatilize during the heat treatment and, hence, a composite oxide having the target composition is difficult to obtain. In addition, heat treatment temperatures exceeding 1,050° C. are undesirable from the standpoint of crystal structure because excessive exchanges of atoms occur between the 6a sites and 6b sites and this tends to result in reduced battery performances. From these standpoints, use of a heat treatment temperature in the range of from 950° C. to 1,025° C. is preferred because a positive active material for lithium secondary batteries having an especially high energy density and excellent charge/discharge cycle performance can be synthesized.

The heat treatment period is preferably from 3 hours to 50 hours. In case where the heat treatment period exceeds 50 hours, a composite oxide having the target composition tends to be difficult to obtain because lithium volatilization is apt to occur during the heat treatment, resulting in substantially impaired battery performances. On the other hand, in case where the heat treatment period is shorter than 3 hours, there is a possibility that crystal growth might be insufficient, resulting in poor battery performances.

The heat treatment is preferably conducted in an atmosphere containing oxygen. In and after that later stage in the heat treatment step in which the temperature is lowered, oxygen atoms tend to be released from the crystal structure of the composite oxide yielded. It is therefore exceedingly preferred to use an oxygen-containing atmosphere especially in and after that stage. Examples of the atmosphere containing oxygen include air.

The lithium secondary battery according to the invention is constituted of: a positive electrode comprising the positive active material for lithium secondary batteries as a major component; a negative electrode comprising as a major component a negative-electrode material capable of doping/undoping lithium ions; and a nonaqueous electrolyte comprising a nonaqueous solvent containing an electrolyte salt. In general, a separator is disposed between the positive electrode and the negative electrode.

As the nonaqueous electrolyte can generally be used any of ones which have been proposed for use in lithium batteries or the like. Examples of the nonaqueous solvent include cyclic carbonic esters such as propylene carbonate, ethylene carbonate, butylene carbonate, chloroethylene carbonate, and vinylene carbonate; cyclic esters such as γ-butyrolactone and γ-valerolactone; chain carbonates such as dimethyl carbonate, diethyl carbonate, and ethyl methyl carbonate; chain esters such as methyl formate, methyl acetate, and methyl butyrate; tetrahydrofuran or derivatives thereof; ethers such as 1,3-dioxane, 1,4-dioxane, 1,2-dimethoxyethane, 1,4-dibutoxyethane, and methyldiglyme; nitriles such as acetonitrile and benzonitrile; dioxolane or derivatives thereof; and ethylene sulfide, sulfolane, sultones, or derivatives thereof. These may be used alone or as a mixture of two or more thereof. However, the nonaqueous solvent should not be construed as being limited to these examples.

Examples of the electrolyte salt include inorganic ion salts containing one of lithium (Li), sodium (Na), and potassium (K), such as $LiClO_4$, $LiBF_4$, $LiAsF_6$, $LiPF_6$, LiSCN, LiBr, LiI, $Li_2SO_4$, $Li_2B_{10}Cl_{10}$, $NaClO_4$, NaI, NaSCN, NaBr, $KClO_4$, and KSCN; and organic ion salts such as $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $(CH_3)_4NBF_4$, $(CH_3)_4NBr$, $(C_2H_5)_4NClO_4$, $(C_2H_5)_4NI$, $(C_3H_7)_4NBr$, $(n-C_4H_9)_4NClO_4$, $(n-C_4H_9)_4NI$, $(C_2H_5)_4N$-maleate, $(C_2H_5)_4N$-benzoate, $(C_2H_5)_4N$-phthalate, lithium stearylsulfonate, lithium octylsulfonate, and lithium dodecylbenzenesulfonate. These ionic compounds can be used alone or as a mixture of two or more thereof.

Preferred of those salts is $LiPF_6$ because it has excellent dissociability and gives excellent conductivity.

Furthermore, $LiBF_4$ has low reactivity with the water present in the liquid electrolyte, although lower in dissociability and conductivity than $LiPF_6$. Use of $LiBF_4$ is therefore preferred because water content control for the liquid electrolyte can be simplified and a reduction in production cost can be attained. In addition, since $LiBF_4$ is less apt to generate hydrofluoric acid, which corrodes the electrodes and sheathing material, use of this salt is preferred in that even when a thin sheathing material having a thickness of 200 µm or smaller, such as a metal/resin composite film, is used, a lithium secondary battery having high durability can be obtained.

Alternatively, a mixture of $LiPF_6$ or $LiBF_4$ with a lithium salt having a perfluoroalkyl group, such as $LiN(C_2F_5SO_2)_2$, may be used. This mixture is preferred because use thereof can further reduce the viscosity of the liquid electrolyte and is effective in improving storability.

The concentration of the electrolyte salt in the nonaqueous electrolyte is preferably from 0.1 mol/l to 5 mol/l, more preferably from 0.5 mol/l to 2.5 mol/l, from the standpoint of obtaining a lithium secondary battery having high battery characteristics without fail.

As the positive electrode of the lithium secondary battery of the invention is used an electrode employing the positive active material for lithium secondary batteries of the invention. In the positive electrode, a mixture of the positive active material for lithium secondary batteries of the invention with one or more other positive active materials may be used.

The positive electrode is produced by kneading the positive active material together with a conductive material and a binder and optionally with a filler to prepare a positive composite, subsequently applying or press-bonding this positive composite to a foil, lath plate, or the like serving as a current collector, and heat-treating the resultant structure at a temperature of about from 50° C. to 250° C. for about 2 hours.

As the negative-electrode material may be selected any material capable of precipitating or doping lithium ions. Examples thereof include lithium metal, lithium alloys (lithium metal-containing alloys such as lithium-aluminum, lithium-lead, lithium-tin, lithium-aluminum-tin, lithium-gallium, and Wood's metal), lithium composite oxides (lithium-titanium), silicon oxide, and carbonaceous materials (e.g., graphites, hard carbon, low-temperature-calcined carbon, and amorphous carbon). Of these materials, graphites have an operating potential very close to that of metallic lithium and can hence realize charge/discharge at a high operating voltage. Furthermore, use of graphites as a negative-electrode material is preferred because these are effective in diminishing self-discharge and reducing the irreversible capacity in charge/discharge in the case of using a lithium salt as an electrolyte salt. For example, artificial graphite and natural graphite are preferred. In particular, a negative-electrode material consisting of graphite particles whose surface has been modified with, e.g., amorphous carbon is desirable because gas generation therefrom during charge is little.

Results of analysis by X-ray diffractometry of graphites which can be advantageously used are shown below.
Lattice spacing ($d_{002}$): 0.333-0.350 nm
Crystallite size in a-axis direction, La: 20 nm or larger
Crystallite size in c-axis direction, Lc: 20 nm or larger
True density: 2.00-2.25 g/cm$^3$ It is also possible to modify a graphite by adding thereto a metal oxide, e.g., tin oxide or silicon oxide, phosphorus, boron, amorphous carbon, or the like. In particular, modifying the surface of a graphite by the method described above is desirable because this modification can inhibit electrolyte decomposition and thereby heighten battery characteristics. Furthermore, a combination of a graphite and either lithium metal or a lithium metal-containing alloy, such as lithium-aluminum, lithium-lead, lithium-tin, lithium-aluminum-tin, lithium-gallium, or Wood's metal, or the like can be used as a negative active material. A graphite into which lithium has been inserted beforehand by electrochemical reduction can also be used as a negative active material.

The powder of the positive active material and the powder of the negative-electrode material desirably have an average particle size of 100 µm or smaller. In particular, it is desirable that the average particle size of the powder of the positive active material be 10 µm or smaller for the purpose of improving the high-output characteristics of the nonaqueous-electrolyte battery. A pulverizer and a classifier are used for obtaining a powder having a given shape. For example, use is made of a mortar, ball mill, sand mill, oscillating ball mill, planetary ball mill, jet mill, counter jet mill, or cyclone type jet mill and sieves or the like. Pulverization may be conducted by wet pulverization in which water or an organic solvent, e.g., hexane, coexists. Methods of classification are not particularly limited, and sieves, an air classifier, or the like is used in each of dry and wet processes according to need.

The positive electrode and negative electrode may contain a conductive material, binder, thickener, filler, and the like as other components besides the major components.

The conductive material is not limited as long as it is an electron-conductive material not adversely influencing battery performance. Usually, however, conductive materials such as natural graphite (e.g., flake graphite, flaky graphite, or soil-like graphite), artificial graphite, carbon black, acetylene black, Ketjen Black, carbon whiskers, carbon fibers, metal (e.g., copper, nickel, aluminum, silver, or gold) powders, metal fibers, and conductive ceramic materials can be incorporated alone or as a mixture thereof.

A preferred conductive material of these is acetylene black from the standpoints of electron-conductive properties and applicability. The amount of the conductive material to be added is preferably from 0.1% by weight to 50% by weight, especially preferably from 0.5% by weight to 30% by weight, based on the total weight of the positive electrode or negative electrode. It is especially desirable to use acetylene black which has been pulverized to ultrafine particles of from 0.1 to 0.5 µm, because use thereof is effective in reducing the amount of carbon required. For mixing those ingredients, physical mixing is conducted. Homogeneous mixing is ideal. For this mixing, a powder mixer such as a V-type mixer, S-type mixer, mortar mill, ball mill, or planetary mill can be used in a dry or wet mixing process.

As the binder can usually be used one of or a mixture of two or more of thermoplastic resins such as polytetrafluoroethylene (PTFE), poly(vinylidene fluoride) (PVDF), polyethylene, and polypropylene and polymers having rubber elasticity, such as ethylene/propylene/diene terpolymers (EPDM), sulfonated EPDM, styrene/butadiene rubbers (SBR), and fluororubbers. The amount of the binder to be added is preferably from 1 to 50% by weight, especially preferably from 2 to 30% by weight, based on the total weight of the positive electrode or negative electrode.

As the thickener can usually be used one of or a mixture of two or more of polysaccharides such as carboxymethyl cellulose and methyl cellulose and the like. In the case of thickeners having functional groups reactive with lithium, such as polysaccharides, it is desired to deactivate the functional groups beforehand by, e.g., methylation. The amount of the thickener to be added is preferably from 0.5 to 10% by weight, especially preferably from 1 to 2% by weight, based on the total weight of the positive electrode or negative electrode.

As the filler may be used any material which does not adversely influence battery performance. Usually, use is made of an olefin polymer such as polypropylene or polyethylene, amorphous silica, alumina, zeolite, glass, carbon, etc. The amount of the filler to be added is preferably up to 30% by weight based on the total weight of the positive electrode or negative electrode.

The positive electrode and negative electrode are produced preferably by mixing the active material, a conductive material, and a binder with an organic solvent, e.g., N-methylpyrrolidone or toluene, subsequently applying the resultant liquid mixture to the current collector which will be described later, and drying the coating. In the application, it is desired to apply the liquid mixture, for example, by roller coating using an applicator roll, screen coating, doctor blade coating, spin coating, or coating with a bar coater or the like in any desired thickness and any desired shape. However, methods of application should not be construed as being limited to these.

As the current collector may be used any electron conductor which does not exert an adverse influence in the battery fabricated. For example, the current collector for the positive electrode can be aluminum, titanium, stainless steel, nickel, calcined carbon, a conductive polymer, conductive glass, or the like. Besides these, use can be made, as the positive-electrode current collector, of a material obtained by treating the surface of aluminum, copper, or the like with carbon, nickel, titanium, silver, or the like for the purpose of improving adhesiveness, conductivity, and oxidation resistance. The current collector for the negative electrode can be copper, nickel, iron, stainless steel, titanium, aluminum, calcined carbon, a conductive polymer, conductive glass, Al—Cd alloy, or the like. Besides these, use can be made, as the negative-electrode current collector, of a material obtained by treating the surface of copper or the like with carbon, nickel, titanium, silver, or the like for the purpose of improving adhesiveness, conductivity, and reduction resistance. These materials can be subjected to a surface oxidation treatment.

With respect to the shape of the current collector, use is made of a foil form or a film, sheet, net, punched or expanded, lath, porous, or foamed form. A structure made up of fibers is also usable. Although the thickness thereof is not particularly limited, collectors having a thickness of from 1 to 500 μm are used. Of these current collectors, a preferred collector for the positive electrode is an aluminum foil, which has excellent oxidation resistance. Preferred current collectors for the negative electrode are a copper foil, nickel foil, and iron foil, which are excellent in reduction resistance and conductivity and are inexpensive, and an alloy foil containing part of these. Furthermore, these foils preferably are ones in which the rough-surface side has a surface roughness Ra of 0.2 μm or more. This surface roughness enables the current collector to be in highly close contact with the positive active material or negative-electrode material. It is therefore preferred to use an electrolytic foil, which has such a rough surface. Most preferred is an electrolytic foil which has undergone a "hana" surface treatment. Furthermore, in the case where these foils are to be coated on both sides, it is desirable that both sides have the same or almost the same surface roughness.

The separator for the lithium secondary battery preferably is one of or a combination of two or more of porous films, nonwoven fabrics, and the like which show excellent rate characteristics. Examples of the material constituting the separator for the lithium secondary battery include polyolefin resins represented by polyethylene and polypropylene, polyester resins represented by poly(ethylene terephthalate) and poly(butylene terephthalate), poly(vinylidene fluoride), vinylidene fluoride/hexafluoropropylene copolymers, vinylidene fluoride/perfluorovinyl ether copolymers, vinylidene fluoride/tetrafluoroethylene copolymers, vinylidene fluoride/trifluoroethylene copolymers, vinylidene fluoride/fluoroethylene copolymers, vinylidene fluoride/hexafluoroacetone copolymers, vinylidene fluoride/ethylene copolymers, vinylidene fluoride/propylene copolymers, vinylidene fluoride/trifluoropropylene copolymers, vinylidene fluoride/tetrafluoroethylene/hexafluoropropylene copolymers, and vinylidene fluoride/ethylene/tetrafluoroethylene copolymers.

The porosity of the separator for the lithium secondary battery is preferably 98% by volume or lower from the standpoint of strength. The porosity thereof is preferably 20% by volume or higher from the standpoint of charge/discharge characteristics.

As the separator for the lithium secondary battery may be used a polymer gel constituted of a polymer of, e.g., acrylonitrile, ethylene oxide, propylene oxide, methyl methacrylate, vinyl acetate, vinylpyrrolidone, poly(vinylidene fluoride), or the like and an electrolyte.

Use of a nonaqueous electrolyte in such a gel form in the invention is preferred in that it has the effect of preventing liquid electrolyte leakage.

Furthermore, the separator for the lithium secondary battery desirably is one which comprises a combination of a porous film, nonwoven fabric, or the like such as that described above and a polymer gel because use of this separator improves liquid electrolyte retention. Namely, the surface of a microporous polyethylene film and the walls of the micropores are coated in a thickness of up to several micrometers with a polymer having affinity for solvents and an electrolyte is caused to held in the micropores of the coated film, whereby the polymer having affinity for solvents gels.

Examples of the polymer having affinity for solvents include poly(vinylidene fluoride) and polymers formed by the crosslinking of an acrylate monomer having an ethylene oxide group or ester group, epoxy monomer, monomer having isocyanate groups, or the like. These monomers can be crosslinked with heating or ultraviolet (UV) in the presence of a free-radical initiator or crosslinked with actinic rays, such as electron beams (EB), or the like.

For the purpose of regulating strength or properties, a property regulator can be incorporated into the polymer having affinity for solvents in such an amount as not to inhibit the formation of a crosslinked structure. Examples of the property regulator include inorganic fillers {metal oxides such as silicon oxide, titanium oxide, aluminum oxide, magnesium oxide, zirconium oxide, zinc oxide, and iron oxide and metal carbonates such as calcium carbonate and magnesium carbonate} and polymers {poly(vinylidene fluoride), vinylidene fluoride/hexafluoropropylene copolymers, polyacrylonitrile, poly(methyl methacrylate), and the like}. The amount of the property regulator to be added is generally up to 50% by weight, preferably up to 20% by weight, based on the crosslinkable monomer.

Examples of the acrylate monomer include unsaturated monomers having a functionality of 2 or higher. Specific examples thereof include difunctional (meth)acrylates {ethylene glycol di(meth)acrylate, propylene glycol di(meth)acrylate, adipic acid dineopentyl glycol ester di(meth)acrylate, polyethylene glycol di(meth)acrylates having a degree of polymerization of 2 or higher, polypropylene glycol di(meth)acrylates having a degree of polymerization of 2 or higher, polyoxyethylene/polyoxypropylene copolymer di(meth)acrylates, butanediol di(meth)acrylate, hexamethylene glycol di(meth)acrylate, and the like}, trifunctional (meth)acrylates {trimethylolpropane tri(meth)acrylate, glycerol tri(meth)acrylate, tri(meth)acrylates of ethylene oxide adducts of glycerol, tri(meth)acrylates of propylene oxide adducts of glycerol, tri(meth)acrylates of ethylene oxide/propylene oxide adducts of glycerol, and the like}, and (meth) acrylates having a functionality of 4 or higher {pentaerythritol tetra(meth)acrylate, diglycerol hexa(meth)acrylate, and the like}. These monomers can be used alone or in combination.

A monofunctional monomer may be added to the acrylate monomer for the purpose of property regulation, etc. Examples of the monofunctional monomer include unsaturated carboxylic acids {acrylic acid, methacrylic acid, crotonic acid, cinnamic acid, vinylbenzoic acid, maleic acid, fumaric acid, itaconic acid, citraconic acid, mesaconic acid, methylmalonic acid, aconitic acid, and the like}; unsaturated sulfonic acids {styrenesulfonic acid, acrylamido-2-methylpropanesulfonic acid, and the like} or salts of these (lithium salts, sodium salts, potassium salts, ammonium salts, tetraalkylammonium salts, and the like); those unsaturated carboxylic acids partly esterified with a $C_1$-$C_{18}$ aliphatic or alicyclic alcohol, alkylene ($C_2$-$C_4$) glycol, polyalkylene ($C_2$-$C_4$) glycol, or the like (methyl maleate, monohydroxyethyl maleate, and the like) and partly amidated with ammonia or a primary or secondary amine (maleic acid monoamide, N-methylmaleic acid monoamide, N,N-diethylmaleic acid monoamide, and the like); (meth)acrylic esters [esters of (meth) acrylic acid with a $C_1$-$C_1$ aliphatic (e.g., methyl, ethyl, propyl, butyl, 2-ethylhexyl, or stearyl) alcohol and esters of (meth) acrylic acid with an alkylene ($C_2$-$C_4$) glycol (ethylene glycol, propylene glycol, 1,4-butanediol, or the like) and with a polyalkylene ($C_2$-$C_4$) glycol (polyethylene glycol or polypropylene glycol)]; (meth)acrylamide or N-substituted (meth)acrylamides [(meth)acrylamide, N-methyl(meth)acrylamide, N-methylol(meth)acrylamide, and the like]; vinyl esters or allyl esters [vinyl acetate, allyl acetate, and the like]; vinyl ethers or allyl ethers [butyl vinyl ether, dodecyl allyl ether, and the like]; unsaturated nitrile compounds [(meth)acrylonitrile, crotononitrile, and the like]; unsaturated alcohols [(meth)allyl alcohol and the like]; unsaturated amines [(meth) allylamine, dimethylaminoethyl (meth)acrylate, diethylaminoethyl (meth)acrylate, and the like]; heterocycle-containing monomers [N-vinylpyrrolidone, vinylpyridine, and the like]; olefinic aliphatic hydrocarbons [ethylene, propylene, butylene, isobutylene, pentene, ($C_6$-$C_{50}$) α-olefins, and the like]; olefinic alicyclic hydrocarbons [cyclopentene, cyclohexene, cycloheptene, norbornene, and the like]; olefinic aromatic hydrocarbons [styrene, α-methylstyrene, stilbene, and the like]; unsaturated imides [maleimide and the like]; and halogen-containing monomers [vinyl chloride, vinylidene chloride, vinylidene fluoride, hexafluoropropylene, and the like].

Examples of the epoxy monomer include glycidyl ethers {bisphenol A diglycidyl ether, bisphenol F diglycidyl ether, brominated bisphenol A diglycidyl ether, phenol-novolac glycidyl ether, cresol-novolac glycidyl ether, and the like}, glycidyl esters {hexahydrophthalic acid glycidyl ester, dimer acid glycidyl esters, and the like}, glycidylamines {triglycidyl isocyanurate, tetraglycidyldiaminophenylmethane, and the like}, linear aliphatic epoxides {epoxidized polybutadiene, epoxidized soybean oil, and the like}, and alicyclic epoxides {3,4-epoxy-6-methylcyclohexylmethylcarboxylate, 3,4-epoxycyclohexylmethylcarboxylate, and the like}. These epoxy resins can be used alone or after having been cured by addition of a hardener thereto.

Examples of the hardener include aliphatic polyamines {diethylenetriamine, triethylenetetramine, 3,9-(3-aminopropyl)-2,4,8,10-tetraoxaspiro[5,5]undecane, and the like}, aromatic polyamines {m-xylenediamine, diaminophenylmethane, and the like), polyamides {dimer acid polyamides and the like}, acid anhydrides {phthalic anhydride, tetrahydromethylphthalic anhydride, hexahydrophthalic anhydride, trimellitic anhydride, and methylnadic anhydride}, phenol compounds {phenolic novolacs and the like}, polymercaptans {polysulfides and the like}, tertiary amines {tris(dimethylaminomethyl)phenol, 2-ethyl-4-methylimidazole, and the like}, and Lewis acid complexes {boron trifluoride/ethylamine complex and the like}.

Examples of the monomer having isocyanate groups include toluene diisocyanate, diphenylmethane diisocyanate, 1,6-hexamethylene diisocyanate, 2,2,4(2,2,4)-trimethylhexamethylene diisocyanate, p-phenylene diisocyanate, 4,4'-dicyclohexylmethane diisocyanate, 3,3'-dimethyldiphenyl 4,4'-diisocyanate, dianisidine diisocyanate, m-xylene diisocyanate, trimethylxylene diisocyanate, isophorone diisocyanate, 1,5-naphthalene diisocyanate, trans-1,4-cyclohexyl diisocyanate, and lysine diisocyanate.

In crosslinking the monomer having isocyanate groups, a compound having active hydrogen may also be used. Examples of this compound include polyols and polyamines [difunctional compounds {water, ethylene glycol, propylene glycol, diethylene glycol, dipropylene glycol, and the like}, trifunctional compounds {glycerol, trimethylolpropane, 1,2,6-hexanetriol, triethanolamine, and the like}, tetrafunctional compounds {pentaerythritol, ethylenediamine, tolylenediamine, diphenylmethanediamine, tetramethylolcyclohexane, methylglucosides, and the like}, pentafunctional compounds {2,2,6,6-tetrakis(hydroxymethyl)cyclohexanol, diethylenetriamine, and the like}, hexafunctional compounds {sorbitol, mannitol, dulcitol, and the like}, and octafunctional compounds {sucrose and the like}], polyether polyols {propylene oxide and/or ethylene oxide adducts of the polyols or polyamines mentioned above}, and polyester polyols [condensates of the aforementioned polyols with a polybasic acid {adipic acid, o-, m-, or p-phthalic acid, succinic acid, azelaic acid, sebacic acid, or ricinoleic acid}, polycaprolactone polyols {poly-ε-caprolactone and the like}, polycondensates of hydroxycarboxylic acids, and the like].

A catalyst may also be used in conducting the crosslinking reaction. Examples of the catalyst include organotin compounds, trialkylphosphines, amines [monoamines {N,N-dimethylcyclohexylamine, triethylamine, and the like}, cyclic monoamines {pyridine, N-methylmorpholine, and the like}, diamines {N,N,N',N'-tetramethylethylenediamine, N,N,N',N'-tetramethyl-1,3-butanediamine, and the like}, triamines {N,N,N',N'-pentamethyldiethylenetriamine and the like}, hexamines {N,N,N',N'-tetra(3-dimethylaminopropyl) methanediamine and the like}, cyclic polyamines {diazabicyclooctane (DABCO), N,N'-dimethylpiperazine, 1,2-dimethylimidazole, 1,8-diazabicyclo(5,4,0)undecene-7 (DBU), and the like}, and salts of these.

A lithium secondary battery according to the invention is produced preferably by a method which comprises superposing a separator for the lithium secondary battery, a positive electrode, and a negative electrode, infiltrating an electrolyte thereinto, for example, before or after the superposition, and finally sealing the case with a sheathing material. In the case of a lithium secondary battery employing a wound power generating element comprising a positive electrode and a negative electrode which have been superposed on each other through a separator for the lithium secondary battery, it is preferred that an electrolyte be infiltrated into the power generating element before and after the winding. Although the infiltration may be conducted at ordinary pressure, the vacuum impregnation method or the pressure impregnation method can be used.

Examples of the material of the sheathing material in the lithium secondary battery include nickel-plated iron, stainless steel, aluminum, and metal/resin composite films. For example, a metal/resin composite film having a constitution comprising resin films and a metal foil sandwiched therebetween is preferred. Examples of the metal foil are not particularly limited as long as they are foils of aluminum, iron, nickel, copper, stainless steel, titanium, gold, silver, or the like which are free from pinholes. However, aluminum foils are preferred because they are lightweight and inexpensive. Preferred for use as the resin film to be disposed on the outer side in the battery is a resin film having excellent piercing strength, such as a poly(ethylene terephthalate) film or nylon film. Preferred as the resin film to be disposed on the inner side in the battery is a film which is fusion-bondable and has solvent resistance, such as a polyethylene film or nylon film.

The constitution of the lithium secondary battery is not particularly limited. Examples thereof include a coin battery and button battery which each have a positive electrode, negative electrode, and separator of a single-layer or multilayer structure, and further include a cylindrical battery, prismatic battery, and flat type battery which each have a positive electrode, negative electrode, and roll-form separator.

EXAMPLE

The invention will be explained below in more detail by reference to Examples. However, the invention should not be construed as being limited by the following statements, and the test methods and the positive active material, negative-electrode material, positive electrode, negative electrode, electrolyte, separator, battery shape, etc. of each battery fabricated are not particularly limited.

Example 1

Into a closed type reaction vessel was introduced 3 L (liters) of water. Thereto was added 32% aqueous sodium hydroxide solution in such an amount as to result in a pH of 11.6. The contents were stirred with a stirrer having a paddle type stirring blades at 1,200 rpm, and the temperature of the solution in the reaction vessel was kept at 50° C. with a heater. Furthermore, argon gas was passed through the solution to remove dissolved oxygen.

On the other hand, a starting-material solution was prepared. The starting-material solution to be used in this Example was obtained by mixing an aqueous manganese sulfate ($MnSO_4$) solution with an aqueous nickel sulfate ($NiSO_4$) solution, aqueous cobalt sulfate ($CoSO_4$) solution, and aqueous hydrazine ($NH_2NH_2$) solution so as to result in a manganese concentration of 0.633 mol/L, nickel concentration of 0.563 mol/L, cobalt concentration of 0.563 mol/L, and hydrazine concentration of 0.0101 mol/L.

While the solution in the reaction vessel was kept being stirred, the starting-material solution was continuously dropped into the reaction vessel at a rate of 3.2 mL/min. Simultaneously with this, 16 mol/L ammonia water was dropped into the reaction vessel at a rate of 0.2 mL/min. Furthermore, 32% aqueous sodium hydroxide solution was intermittently introduced so as to keep the pH of the solution in the reaction vessel constant at 11.6 (±0.05). The resultant slurry was discharged from the system with a flow pump so as to always keep the solution amount constant at 3.0 L. After 60 hours had passed from initiation of the dropwise addition of the starting-material solution and before 5 hours had further passed therefrom, the coprecipitation product slurry was sampled. The slurry sampled was washed with water, filtered, and dried at 100° C. overnight to obtain a powder of an Ni—Mn—Co coprecipitated precursor. Analysis by X-ray diffractometry revealed that the Ni—Mn—Co coprecipitated precursor mainly comprised a $Ni(OH)_2$ type crystal structure.

The Ni—Mn—Co coprecipitated precursor and a powder of lithium hydroxide monohydrate were sufficiently mixed with each other in such weighed amounts as to result in an Li/(Ni+Mn+Co) atomic ratio of 1.1. This mixture was charged into a pot made of alumina. Using an electric furnace through which dry air was kept being passed, the mixture charged was heated to 1,000° C. at a rate of 100° C./hr, held at 1,000° C. for 15 hours, subsequently cooled to 600° C. at a rate of 100° C./hr, and then allowed to cool. Thus, an Li—Mn—Ni—Co composite oxide was obtained. Analysis by X-ray ray diffractometry revealed that the Li—Mn—Ni—Co composite oxide obtained mainly had an α-$NaFeO_2$ structure belonging to the space group R3-m. Through compositional analysis by ICP spectroscopy, the composition of the composite oxide was ascertained to be $Li_{1.1}Mn_{0.36}Ni_{0.32}Co_{0.32}O_2$. The BET specific surface area thereof as measured by the nitrogen adsorption method was 0.5 $m^2$/g. Furthermore, particles of the composite oxide were examined with a scanning electron microscope (SEM). As a result, secondary particles each made up of aggregated primary particles of a nearly cubical shape were observed. A hundred primary particles arbitrarily selected were examined for primary-particle diameter through approximation to spheres. As a result, the primary-particle diameter thereof was found to be 2.6 μm.

Example 2

An Mn—Ni—Co coprecipitated precursor was produced in the same manner as in Example 1, except that use was made of a starting-material solution obtained by mixing an aqueous manganese sulfate ($MnSO_4$) solution with an aqueous nickel sulfate ($NiSO_4$) solution, aqueous cobalt sulfate ($CoSO_4$) solution, and aqueous hydrazine ($NH_2NH_2$) solution so as to result in a manganese concentration of 0.915 mol/L, nickel concentration of 0.422 mol/L, cobalt concentration of 0.422 mol/L, and hydrazine concentration of 0.0101 mol/L. Analysis by X-ray diffractometry revealed that the Mn—Ni—Co coprecipitated precursor mainly comprised a β-$Ni(OH)_2$ type crystal structure.

The Mn—Ni—Co coprecipitated precursor obtained and a powder of lithium hydroxide monohydrate were weighed out so as to result in an Li/(Ni+Mn+Co) atomic ratio of 1.3. An Li—Mn—Ni—Co composite oxide was obtained therefrom in the same manner as in Example 1. As a result of analysis of the thus-obtained Li—Mn—Ni—Co composite oxide by X-ray diffractometry, a diffracted ray thought to be assigned to an $Li_2MnO_3$ phase was observed at 21° besides an $LiMO_2$ structure belonging to the space group R3-m. The ratio of the intensity of the diffracted ray at 2θ=21° to that of the diffracted ray at 2θ=18.6° was calculated and was found to be 0.02. Through compositional analysis by ICP spectroscopy, the composition of the composite oxide was ascertained to be $Li_{1.3}Mn_{0.52}Ni_{0.24}Co_{0.24}O_2$. The BET specific surface area thereof was 0.6 m²/g. As a result of examination with a scanning electron microscope, secondary particles each made up of aggregated primary particles of a nearly cubical shape were observed. A hundred primary particles arbitrarily selected were examined for average diameter through approximation to spheres and, as a result, the average diameter thereof was found to be 1.5 μm.

Example 3

An Mn—Ni—Co coprecipitated precursor was produced in the same manner as in Example 1, except that use was made of a starting-material solution obtained by mixing an aqueous manganese sulfate ($MnSO_4$) solution with an aqueous nickel sulfate ($NiSO_4$) solution, aqueous cobalt sulfate ($CoSO_4$) solution, and aqueous hydrazine ($NH_2NH_2$) solution so as to result in a manganese concentration of 0.915 mol/L, nickel concentration of 0.756 mol/L, cobalt concentration of 0.088 mol/L, and hydrazine concentration of 0.0101 mol/L. Analysis by X-ray diffractometry revealed that the Mn—Ni—Co coprecipitated precursor mainly comprised a $\beta$-$Ni(OH)_2$ type crystal structure.

The Mn—Ni—Co coprecipitated precursor obtained and a powder of lithium hydroxide monohydrate were weighed out so as to result in an Li/(Ni+Mn+Co) atomic ratio of 1.1. An Li—Mn—Ni—Co composite oxide was obtained therefrom in the same manner as in Example 1. As a result of analysis of the thus-obtained Li—Mn—Ni—Co composite oxide by X-ray diffractometry, a diffracted ray thought to be assigned to an $Li_2MnO_3$ phase was observed at 22° besides an $\alpha$-$NaFeO_2$ structure belonging to the space group R3-m. The ratio of the intensity of the diffracted ray at 2θ=22° to that of the diffracted ray at 2θ=18.6° was calculated and was found to be 0.03. Through compositional analysis by ICP spectroscopy, the composition of the composite oxide was ascertained to be $Li_{1.1}Mn_{0.52}Ni_{0.43}Co_{0.05}O_2$. The BET specific surface area thereof was 0.6 m²/g. As a result of examination with a scanning electron microscope, secondary particles each made up of aggregated primary particles of a nearly cubical shape were observed. A hundred primary particles arbitrarily selected were examined for average diameter through approximation to spheres and, as a result, the average diameter thereof was found to be 0.8 μm.

Example 4

An Mn—Ni—Co coprecipitated precursor was produced in the same manner as in Example 1, except that use was made of a starting-material solution obtained by mixing an aqueous manganese sulfate ($MnSO_4$) solution with an aqueous nickel sulfate ($NiSO_4$) solution, aqueous cobalt sulfate ($CoSO_4$) solution, and aqueous hydrazine ($NH_2NH_2$) solution so as to result in a manganese concentration of 0.792 mol/L, nickel concentration of 0.352 mol/L, cobalt concentration of 0.616 mol/L, and hydrazine concentration of 0.0101 mol/L. Analysis by X-ray diffractometry revealed that the Mn—Ni—Co coprecipitated precursor obtained mainly comprised a $\beta$-Ni$(OH)_2$ type crystal structure.

The Mn—Ni—Co coprecipitated precursor obtained and a powder of lithium hydroxide monohydrate were weighed out so as to result in an Li/(Ni+Mn+Co) atomic ratio of 1.2. An Li—Mn—Ni—Co composite oxide was obtained therefrom in the same manner as in Example 1. As a result of analysis of the thus-obtained Li—Mn—Ni—Co composite oxide by X-ray diffractometry, an $\alpha$-$NaFeO_2$ structure belonging to the space group R3-m was mainly detected. Through compositional analysis by ICP spectroscopy, the composition of the composite oxide was ascertained to be $Li_{1.2}Mn_{0.45}Ni_{0.2}Co_{0.35}O_2$. The BET specific surface area thereof was 0.5 m²/g. As a result of examination with a scanning electron microscope, secondary particles each made up of aggregated primary particles of a nearly cubical shape were observed. A hundred primary particles arbitrarily selected were examined for average diameter through approximation to spheres and, as a result, the average diameter thereof was found to be 1.5 μm.

Example 5

An Mn—Ni—Co coprecipitated precursor was produced in the same manner as in Example 1, except that use was made of a starting-material solution obtained by mixing an aqueous manganese sulfate ($MnSO_4$) solution with an aqueous nickel sulfate ($NiSO_4$) solution, aqueous cobalt sulfate ($CoSO_4$) solution, and aqueous hydrazine ($NH_2NH_2$) solution so as to result in a manganese concentration of 0.616 mol/L, nickel concentration of 0.352 mol/L, cobalt concentration of 0.792 mol/L, and hydrazine concentration of 0.0101 mol/L. Analysis by X-ray diffractometry revealed that the Mn—Ni—Co coprecipitated precursor obtained mainly comprised a $\beta$-Ni$(OH)_2$ type crystal structure.

The Mn—Ni—Co coprecipitated precursor obtained and a powder of lithium hydroxide monohydrate were weighed out so as to result in an Li/(Ni+Mn+Co) atomic ratio of 1.2. An Li—Mn—Ni—Co composite oxide was obtained therefrom in the same manner as in Example 1. As a result of analysis of the thus-obtained Li—Mn—Ni—Co composite oxide by X-ray diffractometry, an $\alpha$-$NaFeO_2$ structure belonging to the space group R3-m was mainly detected. Through compositional analysis by ICP spectroscopy, the composition of the composite oxide was ascertained to be $Li_{1.1}Mn_{0.35}Ni_{0.2}Co_{0.45}O_2$. The BET specific surface area thereof was 0.4 m²/g. As a result of examination with a scanning electron microscope, secondary particles each made up of aggregated primary particles of a nearly cubical shape were observed. A hundred primary particles arbitrarily selected were examined for average diameter through approximation to spheres and, as a result, the average diameter thereof was found to be 1.4 μm.

Example 6

An Mn—Ni—Co coprecipitated precursor was produced in the same manner as in Example 1, except that use was made of a starting-material solution obtained by mixing an aqueous manganese sulfate ($MnSO_4$) solution with an aqueous nickel sulfate ($NiSO_4$) solution, aqueous cobalt sulfate ($CoSO_4$) solution, and aqueous hydrazine ($NH_2NH_2$) solution so as to result in a manganese concentration of 0.290 mol/L, nickel concentration of 0.290 mol/L, cobalt concentration of 1.179 mol/L, and hydrazine concentration of 0.0101 mol/L. Analysis by X-ray diffractometry revealed that the Mn—Ni—Co coprecipitated precursor mainly comprised a $\beta$-Ni$(OH)_2$ type crystal structure.

The Mn—Ni—Co coprecipitated precursor obtained and a powder of lithium hydroxide monohydrate were weighed out so as to result in an Li/(Ni+Mn+Co) atomic ratio of 1.0. An Li—Mn—Ni—Co composite oxide was obtained therefrom in the same manner as in Example 1. As a result of analysis of the thus-obtained Li—Mn—Ni—Co composite oxide by X-ray diffractometry, an α-NaFeO$_2$ structure belonging to the space group R3-m was mainly detected. Through compositional analysis by ICP spectroscopy, the composition of the composite oxide was ascertained to be Li$_{1.0}$Mn$_{0.165}$Ni$_{0.165}$Co$_{0.67}$O$_2$. The BET specific surface area thereof was 0.4 m$^2$/g. As a result of examination with a scanning electron microscope, secondary particles each made up of aggregated primary particles of a nearly cubical shape were observed. A hundred primary particles arbitrarily selected were examined for average diameter through approximation to spheres and, as a result, the average diameter thereof was found to be 2.0 μm.

Example 7

An Mn—Ni coprecipitated precursor was produced in the same manner as in Example 1, except that use was made of a starting-material solution obtained by mixing an aqueous manganese sulfate (MnSO$_4$) solution with an aqueous nickel sulfate (NiSO$_4$) solution so as to result in a manganese concentration of 0.880 mol/L and a nickel concentration of 0.880 mol/L. Analysis by X-ray diffractometry revealed that the Mn—Ni coprecipitated precursor obtained mainly comprised a β-Ni(OH)$_2$ type crystal structure.

The Mn—Ni coprecipitated precursor obtained was mixed with tricobalt tetroxide (Co$_3$O$_4$) and LiOH in such amounts as to result in an Li:Mn:Ni:Co atomic ratio of 1.0:0.165:0.165:0.67 by means of a planetary powder mixer. This mixture was heat-treated under the same conditions as in Example 1 to thereby produce an Li—Mn—Ni—Co composite oxide. As a result of analysis of the Li—Mn—Ni—Co composite oxide by X-ray diffractometry, an α-NaFeO$_2$ structure belonging to the space group R3-m was mainly detected. Through compositional analysis by ICP spectroscopy, the composition of the composite oxide was ascertained to be Li$_{1.0}$Mn$_{0.165}$Ni$_{0.165}$Co$_{0.67}$O$_2$. The BET specific surface area thereof was 0.5 m$^2$/g. As a result of examination with a scanning electron microscope, secondary particles each made up of aggregated primary particles of a nearly cubical shape were observed. A hundred primary particles arbitrarily selected were examined for average diameter through approximation to spheres and, as a result, the average diameter thereof was found to be 1.8 μm.

Example 8

An Mn—Ni—Co coprecipitated precursor was produced in the same manner as in Example 1, except that use was made of a starting-material solution obtained by mixing an aqueous manganese sulfate (MnSO$_4$) solution with an aqueous nickel sulfate (NiSO$_4$) solution, aqueous cobalt sulfate (CoSO$_4$) solution, and aqueous hydrazine (NH$_2$NH$_2$) solution so as to result in a manganese concentration of 0.880 mol/L, nickel concentration of 0.440 mol/L, cobalt concentration of 0.440 mol/L, and hydrazine concentration of 0.0101 mol/L, and that the inert-gas bubbling in the reaction vessel was omitted. As a result of analysis by X-ray diffractometry, diffracted rays were observed at around 2θ=10° and around 2θ=22° besides an intense diffracted ray at around 2θ=20°, showing that the Mn—Ni—Co coprecipitated precursor had both β-Ni(OH)$_2$ and an α-Ni(OH)$_2$ type crystal structure.

The Mn—Ni—Co coprecipitated precursor obtained and a powder of lithium hydroxide monohydrate were weighed out so as to result in an Li/(Ni+Mn+Co) atomic ratio of 1.1. An Li—Mn—Ni—Co composite oxide was obtained therefrom in the same manner as in Example 1. As a result of analysis by X-ray diffractometry, a diffracted ray thought to be assigned to an Li$_2$MnO$_3$ phase was observed at 22° besides an α-NaFeO$_2$ structure belonging to the space group R3-m. The ratio of the intensity of the diffracted ray at 2θ=22° to that of the diffracted ray at 2θ=18.7° was calculated and was found to be 0.06. Through compositional analysis by ICP spectroscopy, the composition of the composite oxide was ascertained to be Li$_{1.1}$Mn$_{0.5}$Ni$_{0.25}$Co$_{0.25}$O$_2$. The BET specific surface area thereof was 0.6 m$^2$/g. A hundred primary particles arbitrarily selected from ones observed with a scanning electron microscope were examined for average diameter through approximation to spheres and, as a result, the average diameter thereof was found to be 2.0 μm.

Comparative Example 1

An Mn—Ni—Co coprecipitated precursor was produced in the same manner as in Example 1, except that use was made of a starting-material solution obtained by mixing an aqueous manganese sulfate (MnSO$_4$) solution with an aqueous nickel sulfate (NiSO$_4$) solution, aqueous cobalt sulfate (CoSO$_4$) solution, and aqueous hydrazine (NH$_2$NH$_2$) solution so as to result in a manganese concentration of 1.055 mol/L, nickel concentration of 0.352 mol/L, cobalt concentration of 0.352 mol/L, and hydrazine concentration of 0.0101 mol/L. Analysis by X-ray diffractometry revealed that the Mn—Ni coprecipitated precursor obtained mainly comprised a β-Ni(OH)$_2$ type crystal structure.

The Mn—Ni—Co coprecipitated precursor obtained and a powder of lithium hydroxide monohydrate were weighed out so as to result in an Li/(Ni+Mn+Co) atomic ratio of 1.3. An Li—Mn—Ni—Co composite oxide was obtained therefrom in the same manner as in Example 1. As a result of analysis by X-ray diffractometry, a diffracted ray thought to be assigned to an Li$_2$MnO$_3$ phase was observed at 21° besides an α-NaFeO$_2$ structure belonging to the space group R3-m. The ratio of the intensity of the diffracted ray at 2θ=21° to that of the diffracted ray at 2θ=18.6° was calculated and was found to be 0.04. Through compositional analysis by ICP spectroscopy, the composition of the composite oxide was ascertained to be Li$_{1.3}$Mn$_{0.6}$Ni$_{0.2}$Co$_{0.2}$O$_2$. The BET specific surface area thereof was 1.5 m$^2$/g. A hundred primary particles arbitrarily selected from ones observed with a scanning electron microscope were examined for average diameter through approximation to spheres and, as a result, the average diameter thereof was found to be 2.4 μm.

Comparative Example 2

An Mn—Ni—Co coprecipitated precursor was produced in the same manner as in Example 1, except that use was made of a starting-material solution obtained by mixing an aqueous manganese sulfate (MnSO$_4$) solution with an aqueous nickel sulfate (NiSO$_4$) solution, aqueous cobalt sulfate (CoSO$_4$) solution, and aqueous hydrazine (NH$_2$NH$_2$) solution so as to result in a manganese concentration of 0.704 mol/L, nickel concentration of 0.176 mol/L, cobalt concentration of 0.880 mol/L, and hydrazine concentration of 0.0101 mol/L. Analysis by X-ray diffractometry revealed that the Mn—Ni—Co coprecipitated precursor obtained mainly comprised a β-Ni(OH)$_2$ type crystal structure.

The Mn—Ni—Co coprecipitated precursor obtained and a powder of lithium hydroxide monohydrate were weighed out so as to result in an Li/(Ni+Mn+Co) atomic ratio of 1.3. An Li—Mn—Ni—Co composite oxide was obtained therefrom in the same manner as in Example 1. As a result of analysis by X-ray diffractometry, a diffracted ray thought to be assigned to an $Li_2MnO_3$ phase was observed at 22° besides an $LiMO_2$ structure belonging to the space group R3-m. The ratio of the intensity of the diffracted ray at 2θ=22° to that of the diffracted ray at 2θ=18.7° was calculated and was found to be 0.03. Through compositional analysis by ICP spectroscopy, the metallic composition of the composite oxide was ascertained to be the same as the proportions of the metals used as starting materials. The BET specific surface area thereof was 0.3 $m^2/g$. A hundred primary particles arbitrarily selected from ones observed with a scanning electron microscope were examined for average diameter through approximation to spheres and, as a result, the average diameter thereof was found to be 2.1 μm.

positional analysis by ICP spectroscopy, the composition of the composite oxide was ascertained to be $Li_{1.2}Mn_{0.2}Ni_{0.1}Co_{0.7}O_2$. The BET specific surface area thereof was 0.8 $M^2/g$. A hundred primary particles arbitrarily selected from ones observed with a scanning electron microscope were examined for average diameter through approximation to spheres and, as a result, the average diameter thereof was found to be 2.6 μm.

Properties of the composite oxides (positive active materials) according to Examples 1 to 8 and Comparative Examples 1 to 3 are summarized in Table 1. The compositions of all of the Li—Mn—Ni—Co composite oxides produced in the Examples and Comparative Examples are shown in the ternary phase diagram of FIG. 1 in terms of the values of a, b, and c in the composite formula $Li_xMn_aNi_bCo_cO_2$.

TABLE 1

| Positive active material | Composition in $Li_xMn_aNi_bCo_cO_2$ | | | | Li—Mn—Ni—Co composite oxide | | |
|---|---|---|---|---|---|---|---|
| | | | | | Intensity ratio between diffracted | BET specific surface area | Primary-particle diameter |
| | x | a | b | c | rays (s/m) | $m^2/g$ | μm |
| Example 1 | 1.1 | 0.360 | 0.320 | 0.320 | — | 0.5 | 2.6 |
| Example 2 | 1.3 | 0.520 | 0.240 | 0.240 | 0.02 | 0.6 | 1.5 |
| Example 3 | 1.1 | 0.520 | 0.430 | 0.050 | 0.03 | 0.6 | 0.8 |
| Example 4 | 1.2 | 0.450 | 0.200 | 0.350 | — | 0.5 | 1.5 |
| Example 5 | 1.2 | 0.350 | 0.200 | 0.450 | — | 0.4 | 1.4 |
| Example 6 | 1.0 | 0.165 | 0.165 | 0.670 | — | 0.4 | 2.0 |
| Example 7 | 1.0 | 0.165 | 0.165 | 0.670 | — | 0.5 | 1.8 |
| Example 8 | 1.1 | 0.500 | 0.250 | 0.250 | 0.06 | 0.6 | 2.0 |
| Comparative Example 1 | 1.3 | 0.600 | 0.200 | 0.200 | 0.04 | 1.5 | 2.4 |
| Comparative Example 2 | 1.3 | 0.400 | 0.100 | 0.500 | 0.03 | 0.3 | 2.1 |
| Comparative Example 3 | 1.2 | 0.200 | 0.100 | 0.700 | — | 0.8 | 2.6 |

*In the column "Intensity ratio between diffracted rays", "—" indicates that the diffracted ray s was not detected.

Comparative Example 3

An Mn—Ni—Co coprecipitated precursor was produced in the same manner as in Example 1, except that use was made of a starting-material solution obtained by mixing an aqueous manganese sulfate ($MnSO_4$) solution with an aqueous nickel sulfate ($NiSO_4$) solution, aqueous cobalt sulfate ($CoSO_4$) solution, and aqueous hydrazine ($NH_2NH_2$) solution so as to result in a manganese concentration of 0.352 mol/L, nickel concentration of 0.176 mol/L, cobalt concentration of 1.231 mol/L, and hydrazine concentration of 0.0101 mol/L. Analysis by X-ray diffractometry revealed that the Mn—Ni—Co coprecipitated precursor obtained mainly comprised a β-Ni(OH)$_2$ type crystal structure.

The Mn—Ni—Co coprecipitated precursor obtained and a powder of lithium hydroxide monohydrate were weighed out so as to result in an Li/(Ni+Mn+Co) atomic ratio of 1.2. An Li—Mn—Ni—Co composite oxide was obtained therefrom in the same manner as in Example 1. As a result of analysis of the thus-obtained Li—Mn—Ni—Co composite oxide by X-ray diffractometry, an α-$NaFeO_2$ structure belonging to the space group R3-m was mainly detected, showing that the composite oxide had an α-$NaFeO_2$ structure. Through com- Production of Lithium Secondary Batteries Each of the Li—Mn—Ni—Co composite oxides obtained in the Examples and Comparative Examples was used as a positive active material to produce a battery. The positive active material, acetylene black as a conductive material, and poly(vinylidene fluoride) (PVdF) as a binder were mixed together in a proportion of 85:10:5 by weight. Thereto was added N-methyl-2-pyrrolidone (NMP). The resultant mixture was sufficiently kneaded to obtain a positive-electrode paste. This positive-electrode paste was applied to one side of an aluminum foil current collector having a thickness of 20 μm, and the coating was allowed to dry naturally at an ordinary temperature of about 25° C. Subsequently, the paste was likewise applied to the other side and allowed to dry naturally at an ordinary temperature of about 25° C. Thereafter, the coated foil was dried at 130° C. under reduced pressure for 12 hours, subsequently pressed, and then cut into a 1-$cm^2$ disk. Thus, a positive electrode was obtained.

Artificial graphite (average particle diameter, 6 μm; lattice spacing ($d_{002}$) determined by X-ray diffractometry, 0.337 nm; crystalline size in c-axis direction (Lc), 55 nm) as a negative-electrode material was mixed with poly(vinylidene fluoride) (PVdF) in a proportion of 95:5 by weight. Thereto was added N-methyl-2-pyrrolidone (NMP). This mixture was sufficiently kneaded to obtain a negative-electrode paste. Subsequently, the negative-electrode paste was applied to one side of a 12 μm-thick electrolytic copper foil on a copper foil current collector having a thickness of 15 μm and allowed to dry naturally at an ordinary temperature of about 25° C. Thereafter, the negative-electrode paste was likewise applied to the other side and allowed to dry naturally at an ordinary temperature of about 25° C. Furthermore, the coated foil was dried at 130° C. under reduced pressure for 12 hours, subsequently pressed, and then cut into a 1-cm² disk. Thus, a negative electrode was obtained.

$LiPF_6$, a fluorine-containing electrolyte salt, was dissolved in a concentration of 1 mol/L in a mixed solvent prepared by mixing ethylene carbonate with diethyl carbonate in a proportion of 1:1 by volume to produce a nonaqueous electrolyte. This electrolyte had a water content regulated to below 20 ppm.

Using the members described above, a coin type lithium secondary battery was fabricated in a dry atmosphere having a dew point of −50° or lower. The positive electrode was press-bonded, before use, to a positive-electrode can having a positive-electrode current collector. The negative electrode was press-bonded, before use, to a negative-electrode can having a negative-electrode current collector. A coin type lithium secondary battery having a diameter of 20 mm and a thickness of 1.6 mm was fabricated using the positive electrode, negative electrode, and electrolyte described above and a separator.

(Inventive Batteries 1 to 7 and Comparative Batteries 1 to 3)

The Li—Mn—Ni—Co composite oxides obtained in Examples 1 to 7 and Comparative Examples 1 to 3 were used as positive active materials to fabricate lithium secondary batteries by the method described above. These batteries are referred to as inventive batteries 1 to 7 and comparative batteries 1 to 3, respectively.

Charge/Discharge Cycle Test

Many battery samples were produced with respect to each of inventive batteries 1 to 7 and Comparative batteries 1 to 3, and subjected to ten cycles of low-rate charge/discharge. This charge was constant-current constant-voltage charge conducted under the conditions of a current of 0.1 ItA and a voltage of 4.2 V, while the discharge was constant-current discharge conducted under the conditions of a current of 0.1 ItA and a final voltage of 3.0 V. The discharge capacity (mAh) as measured in the 10th cycle is shown in Table 2.

Subsequently, the 11th and succeeding cycles were conducted as a high-rate charge/discharge cycle test. The charge was constant-current constant-voltage charge conducted under the conditions of a current of 5.0 ItA and a voltage of 4.2 V, while the discharge was constant-current discharge conducted under the conditions of a current of 5.0 ItA and a final voltage of 2.5 V. The discharge capacities (mAh) as measured at the 11th cycle and 60th cycle of the 5.0-ItA charge/discharge are shown in Table 2. The percentage of the discharge capacity at the 60th cycle to the discharge capacity at the 11th cycle is also shown in Table 2 as "capacity retention (%)".

TABLE 2

| Battery | Discharge capacity in 10th cycle mAh/g (0.1 ItA) | Discharge capacity in 11th cycle mAh/g (5.0 ItA) | Discharge capacity in 60th cycle mAh/g (5.0 ItA) | Capacity retention % |
|---|---|---|---|---|
| Inventive battery 1 | 140 | 91.0 | 90.4 | 99.3 |
| Inventive battery 2 | 130 | 91.0 | 82.6 | 90.8 |
| Inventive battery 3 | 139 | 97.3 | 95.9 | 98.6 |
| Inventive battery 4 | 130 | 97.5 | 96.0 | 98.5 |
| Inventive battery 5 | 137 | 109.6 | 108.0 | 98.5 |
| Inventive battery 6 | 156 | 124.8 | 121.6 | 97.4 |
| Inventive battery 7 | 156 | 124.8 | 121.6 | 97.4 |
| Comparative battery 1 | 60 | 36.0 | 6.0 | 16.7 |
| Comparative battery 2 | 100 | 70.0 | 45.5 | 65.0 |
| Comparative battery 3 | 145 | 116.0 | 104.0 | 89.7 |

(Relationship Between Elemental Constitution and Battery Performance)

As can be seen from the results of the battery tests shown in Table 2, the inventive batteries, which employed Li—Mn—Ni—Co composite oxides having a composition within the compositional range specified in the invention, had a higher discharge capacity than the comparative batteries, which employed composite oxides having a composition outside the compositional range. In addition, even through 50 cycles of charge/discharge conducted at an exceedingly high rate of 5.0 ItA, the inventive batteries showed such remarkable stability to charge/discharge cycling that the capacity retention was 90% or higher.

The Li—Mn—Ni—Co composite oxides according to all the Examples and Comparative Examples given above each gave an X-ray diffraction diagram having a diffracted ray assigned to R3-m as stated above. Of these, the Li—Mn—Ni—Co composite oxides according to Examples 1 and 2 and Comparative Examples 1 and 2 each gave an X-ray diffraction diagram in which a diffracted ray at around 2θ=21° thought to be assigned to an $Li_2MnO_3$ phase was observed in addition to the crystal phase belonging to the space group R3-m.

The reasons why a crystal phase thought to be based on $Li_2MnO_3$ was observed in Examples 1 and 2 and Comparative Example 1 among those may be that since the proportion of manganese element in each of these composite oxides was high, manganese atoms in the crystal lattice formed an unstable ligand field and this resulted in the formation of an eutectic of $Li_2MnO_3$ at the stage of solid-phase reactions in the head treatment step. In this connection, a comparison in battery performance among inventive batteries 1 and 2 and comparative battery 1, which employed those composite oxides as positive active materials, shows that comparative battery 1 was clearly inferior to inventive batteries 1 and 2 in discharge capacity, high-rate charge/discharge performance, and charge/discharge cycle performance. From these results, it was considered that the upper limit of the proportion of manganese is 0.55 from the standpoint of obtaining a positive active material for lithium secondary batteries which does not contain $Li_2MnO_3$ in too large an amount and has satisfactory electrochemical performances.

On the other hand, with respect to the reason why a crystal phase thought to be based on $Li_2MnO_3$ was observed in Comparative Example 2, this is presumed to be related to the composition which was in such a region that a single crystal system was difficult to exist because of the low proportion of nickel element, and to the relatively high proportion of manganese element. In this connection, Comparative Example 2 and Example 5, which were similar in composition to each other, are compared. A comparison between comparative battery 2 and inventive battery 5 in electrochemical performance shows that comparative battery 2 was clearly inferior to inventive battery 5 in discharge capacity, high-rate charge/discharge performance, and charge/discharge cycle performance. The same tendency applies in the case of Comparative Example 3 and Example 6, which were similar in composition to each other, i.e., in the case of a comparison between comparative battery 3 and inventive battery 6 in electrochemical performance. It was considered from these that the lower limit of the proportion of nickel is 0.15 from the standpoint of obtaining a positive active material for lithium secondary batteries which has satisfactory electrochemical performances.

Among inventive batteries 1 to 7, inventive batteries 6 and 7 showed an especially high discharge capacity and stable charge/discharge cycle performance. It was found from these results that when a composite oxide having a composition within the range specified in the invention is regulated so as to be represented by the composite formula $Li_xMn_aNi_bCo_cO_2$ wherein $c/(a+b+c) \geqq 0.5$, then a positive active material capable of enabling a battery to combine an especially high energy density and satisfactory charge/discharge cycle performance can be obtained.

Figure 2:
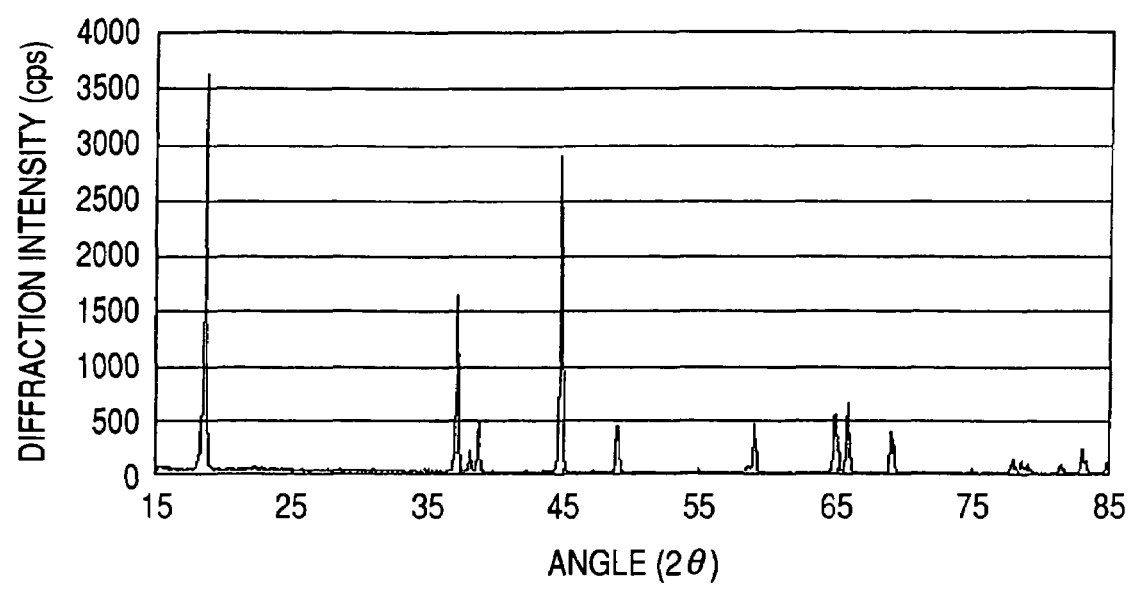
FIG. 2 is an X-ray diffraction diagram of the positive active material for lithium secondary batteries according to Example 6.
Figure 3:
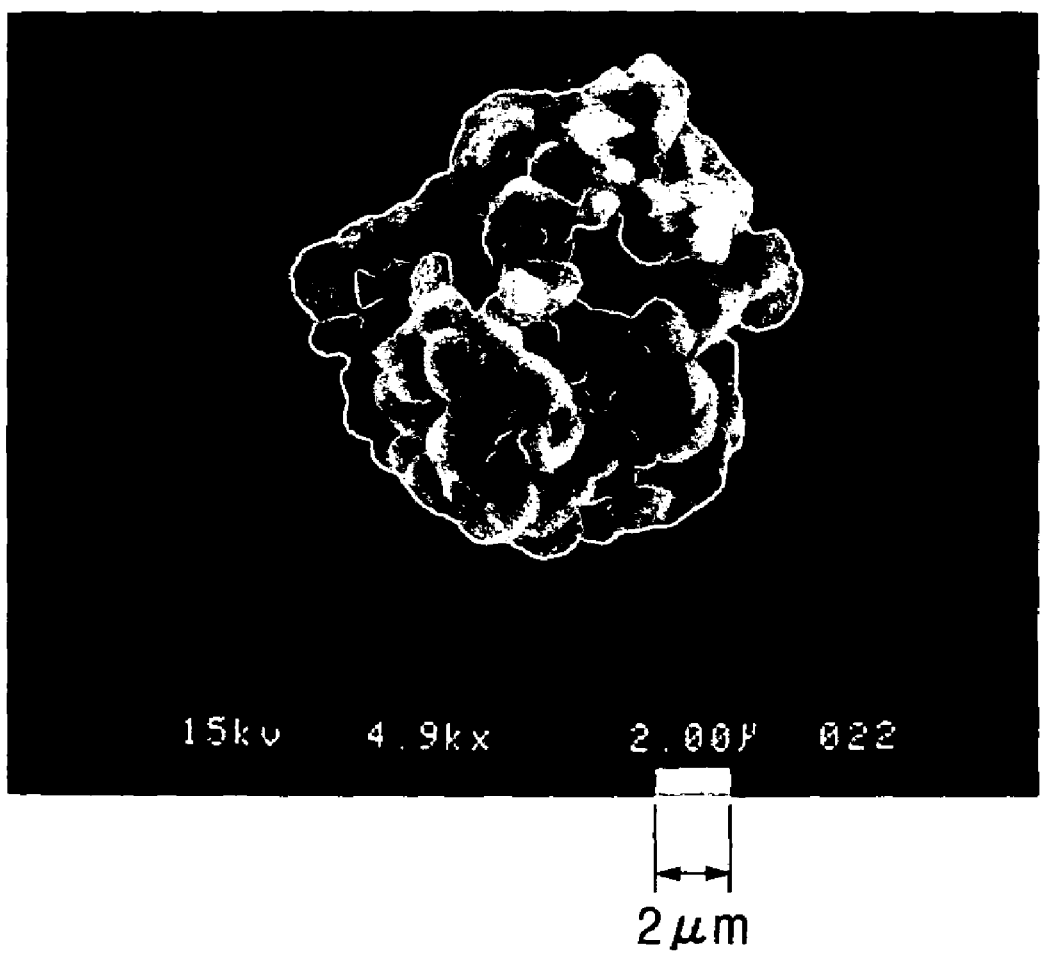
FIG. 3 is a scanning electron microscope (SEM) photograph of the positive active material for lithium secondary batteries according to Example 6.

In each of the Examples and Comparative Examples given above, the peak of the diffraction (A) appearing at around $2\theta=18.6°$ was located in an exceedingly narrow range of $18.6°\pm0.3°$, while the peak of the diffracted ray (B) appearing at around $2\theta=44.1°$ also was located in an exceedingly narrow range of $44.1\pm1°$. The intensity ratio between these diffracted rays A and B (B/A) was determined and, as a result, the values of that ratio for the Examples and Comparative Examples were found to be in the range of from 0.65 to 0.95. These results indicate that crystals had sufficiently grown in each composite oxide. An X-ray diffraction diagram of the Li—Mn—Ni—Co composite oxide according to Example 6 is shown in FIG. 2. Those values of intensity ratio (B/A) were ones obtained by examining powders of these composite oxides before pressing. It was ascertained that pressing the powders of these composite oxides results in a considerable decrease in the intensity ratio. In FIG. 3 is shown a scanning electron microscope (SEM) photograph of the Li—Mn—Ni—Co composite oxide according to Example 6. On this photograph can be observed a secondary particle made up of gathered primary particles having the shape of nearly a rectangular parallelopiped in which the ratio of the dimension of the longest side to that of the shortened side is 2 or smaller.

As described above in detail, a positive active material for lithium secondary batteries having a high energy density and excellent charge/discharge cycle performance can be provided by the invention. The invention can further provide a lithium secondary battery having a high energy density and excellent charge/discharge cycle performance.

The positive active material according to the invention retains a stable crystal structure even at potentials around 5 V (v.s. $Li/Li^+$) and has the possibility of attaining a higher energy density. The inventors are presently conducting a test in which a charge voltage of 4.6 V is used in place of the 4.2 V used above. At the time when tens of cycles have passed in this test, the inventive batteries show satisfactory charge/discharge cycle performance with an exceedingly slight decrease in capacity.

The invention may be embodied in other various forms without departing from the spirit or essential characteristics thereof. The embodiments or Examples described above are therefore to be considered in all respects as illustrative and not restrictive. The scope of the invention is indicated by the claims rather than by the description, and all changes and modifications which come within the meaning and range of equivalency of the claims are intended to be embraced therein.

INDUSTRIAL APPLICABILITY

According to the invention, which has been achieved in order to eliminate the problems described above, a positive active material for lithium secondary batteries having a high energy density and excellent charge/discharge cycle performance can be provided. Furthermore, the invention can provide a lithium secondary battery having a high energy density and excellent charge/discharge cycle performance.

The invention claimed is:

1. A positive active material for lithium secondary batteries, comprising:
    a composite oxide comprising:
        an oxide which is represented by the composite formula $Li_xMn_aNi_bCo_cO_2$ and has an $\alpha$-$NaFeO_2$ structure; and
        an impurity phase comprising $Li_2MnO_3$,
    wherein a, b, and c are values within such a range that in a ternary phase diagram showing the relationship among these, (a, b, c) is present on the perimeter of or inside the quadrilateral ABCD defined by point A (0.5, 0.5, 0), point B(0.55, 0.45, 0), point C (0.55, 0.15, 0.30), and point D(0.15, 0.15, 0.7) as vertexes, and $0.95 < x/(a+b+c) < 1.35$.

2. The positive active material for lithium secondary batteries of claim 1, wherin the composite oxide in X-ray powder diffractometry with $CuK_\alpha$ ray, gives a diffraction diagram in which the s/m ratio is less than 0.04, where s is the intensity of the diffracted ray at $2\theta=21\pm1.5°$, and m is the intensity of the diffracted ray at $2\theta=18.6\pm0.3°$.

3. The positive active material for lithium secondary batteries of claim 1, wherein the composite oxide has a BET specific surface area as measured by the $N_2$ adsorption method of 0.3 $m^2$/g or greater.

4. The positive active material for lithium secondary batteries of claim 1, wherein the composite oxide comprises particles which are secondary particles formed by the aggregation of primary particles, the primary particles having the shape of nearly a rectangular parallelopiped in which the ratio of the dimension of the longest side to that of the shortest side is 2 or less, and the primary particles having an average diameter of 0.6 μm or greater.

5. The positive active material for lithium secondary batteries of claim 1, wherein the composite oxide is one obtained by mixing a precursor with a lithium compound and heat-treating the mixture, the precursor mainly comprising a compound which has manganese and nickel as transition metal elements and has a $\beta$-$Ni(OH)_2$ crystal structure.

6. The positive active material for lithium secondary batteries of claim 1, wherein the composite oxide is one obtained by mixing a precursor with a lithium compound and heat-treating the mixture, the precursor mainly comprising a compound which has manganese, nickel and cobalt as transition metal elements and has a $\beta$-$Ni(OH)_2$ crystal structure.

7. The positive active material for lithium secondary batteries of claim 5, wherein the lithium compound comprises LiOH.

8. A lithium secondary battery comprising:
a positive electrode comprising the positive active material for lithium secondary batteries of claim 1; and
a negative electrode comprising a negative-electrode material capable of doping/undoping lithium ions.

9. The positive active material for lithium secondary batteries of claim 6, wherein the lithium compound comprises LiOH.

10. The positive active material for lithium secondary batteries of claim 2, wherein the composite oxide has a BET specific area as measured by the $N_2$ adsorption method of 0.3 $m^2/g$ or greater.

11. The positive active material for lithium secondary batteries of claim 2, wherein the composite oxide comprises particles which are secondary particles formed by the aggregation of primary particles, the primary particles having the shape of nearly a rectangular parallelopiped in which the ratio of the dimension of the longest side to that of the shortest side is 2 or less, and the primary particles having an average diameter of 0.6 μm or greater.

12. The positive active material for lithium secondary batteries of claim 2, wherein the composite oxide is one obtained by mixing a precursor with a lithium compound and heat-treating the mixture, the precursor mainly comprising a compound which has manganese and nickel as transition metal elements and has a $\beta$-Ni(OH)$_2$ crystal structure.

13. The positive active material for lithium secondary batteries of claim 2, wherein the composite oxide is one obtained by mixing a precursor with a lithium compound and heat-treating the mixture, the precursor mainly comprising a compound which has manganese, nickel and cobalt as transition metal elements and has a $\beta$-Ni(OH)$_2$ crystal structure.

14. The positive active material for lithium secondary batteries of claim 2, wherin the composite oxide is one obtained by mixing a precursor mainly comprising a compound which has manganese and nickel as transition metal elements and has a $\beta$-(OH)$_2$ crystal structure, with a lithium compound and with a precursor comprising a cobalt compound and heat-treating the mixture.

15. The positive active material for lithium secondary batteries of claim 1, wherein the composite oxide is one obtained by mixing a precursor mainly comprising a compound which has manganese and nickel as transition metal elements and has a $\beta$-Ni(OH)$_2$ crystal structure, with a lithium compound and with a precursor comprising a cobalt compound and heat-treating the mixture.

16. The positive active material for lithium secondary batteries of claim 15, wherein the precursor comprising a cobalt compound comprises one of an oxide and a carbonation product salt.

17. The positive active material for lithium secondary batteries of claim 15, wherein the lithium compound comprises LiOH.

18. The positive active material for lithium secondary batteries of claim 14, wherein the precursor comprising a cobalt compound comprises one of an oxide and a carbonation product salt.

19. The positive active material for lithium secondary batteries of claim 1, wherein said $Li_2MnO_3$ has a structure in which a lithium phase and an $LiMn_2$ phase are alternately superposed through oxygen atoms to have the same structure as said $\alpha$-NaFeO$_2$ structure.

20. The positive active material for lithium secondary batteries of claim 1, wherein said $Li_2MnO_3$ and said oxide coexist in a solid solution state.

\* \* \* \* \*